US006576041B2

(12) United States Patent
Cole

(10) Patent No.: US 6,576,041 B2
(45) Date of Patent: **\*Jun. 10, 2003**

(54) METHOD AND APPARATUS FOR CHEMICAL PROCESSING

(75) Inventor: John A. Cole, Winnemucca, NV (US)

(73) Assignee: Newmont USA Limited, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/967,286

(22) Filed: Sep. 28, 2001

(65) Prior Publication Data

US 2002/0062716 A1 May 30, 2002

Related U.S. Application Data

(63) Continuation-in-part of application No. 09/675,598, filed on Sep. 29, 2000, now Pat. No. 6,395,063.
(60) Provisional application No. 60/236,454, filed on Sep. 29, 2000.

(51) Int. Cl.[7] .............................. C22B 3/02; C22B 3/22
(52) U.S. Cl. .................. 75/744; 205/291; 266/101; 422/269; 423/27

(58) Field of Search .................. 75/744; 205/291; 266/101; 422/269; 423/27

(56) References Cited

U.S. PATENT DOCUMENTS

| | | | | |
|---|---|---|---|---|
| 1,528,206 A | * | 3/1925 | Greenwalt | 266/101 |
| 4,265,739 A | | 5/1981 | Dalton | 209/169 |
| 4,606,763 A | | 8/1986 | Weir | 75/101 R |
| 5,021,069 A | * | 6/1991 | Whellock et al. | 44/622 |
| 5,489,326 A | | 2/1996 | Thomas et al. | 75/744 |
| 6,183,706 B1 | | 2/2001 | King | 423/23 |

* cited by examiner

Primary Examiner—Melvyn Andrews
(74) Attorney, Agent, or Firm—Marsh Fischmann & Breyfogle

(57) ABSTRACT

A system and method are disclosed after chemical processing involving agitation and/or mixing of components. In one embodiment, the chemical processing involves pressure oxidation and in another embodiment involves pressure leaching. Agitation during chemical processing is aided by an agitator pump disposed in each compartment or stage of a reactor to draw components into a cavity of the agitator pump. In another embodiment, feed to a multi-stage reactor is split between different compartments of reactor.

82 Claims, 9 Drawing Sheets

METHOD AND APPARATUS FOR CHEMICAL PROCESSING

CROSS-REFERENCE TO RELATED APPLICATIONS

This application is a continuation-in-part of pending U.S. patent application Ser. No. 09/675,598 by Cole entitled "PRESSURE OXIDATION OF SULFIDE GOLD ORES INVOLVING ENHANCED OXYGEN-SULFIDE CONTACT" filed Sep. 29, 2000, now U.S. Pat. No. 6,395,063 the entire contents of which are incorporated herein as if set forth herein in full. This application claims a priority benefit under 35 U.S.C. §119(e) to U.S. Provisional Patent Application No. 60/236,454 by Cole entitled "METHOD AND APPARATUS FOR CHEMICAL PROCESSING" filed Sep. 29, 2000, the entire contents of which are incorporated herein as if set forth herein in full.

FIELD OF THE INVENTION

The present invention generally relates to pressure oxidation and pressure leaching of metal-containing minerals materials to facilitate metal recovery, and to other chemical processing operations involving mixing of or contact between multiple components.

BACKGROUND OF THE INVENTION

Many chemical processing operations involve intimate contact of two or more components in a reactor. As one example, pressure oxidation of metal-bearing mineral materials involves contacting a slurry of the mineral material with an oxidant, typically oxygen gas, at elevated temperature and pressure to oxidize one or more of the minerals, thereby freeing metal values of interest for possible recovery in subsequent metal recovery operations. Pressure oxidation has been used to process a variety of sulfide ores, including both base metal and precious metal-containing sulfide ores. Sulfide concentrates prepared from flotation of such ores have also been processed by pressure oxidation, either alone or in a blend with whole ore material. During pressure oxidation one or more sulfide mineral is oxidized, with sulfide sulfur of the sulfide minerals typically being oxidized to a sulfate form. This oxidation results in decomposition of the sulfide minerals and release of the metal values. Pressure oxidation operations are typically conducted in an acidic environment, such as in the presence of a sulfuric acid solution, although some pressure oxidation operations have been conducted in an alkaline environment, such as in the presence of a hydroxide or carbonate solution.

In some pressure oxidation operations, the metal(s) are dissolved during the pressure oxidation operation and in subsequent metal recovery operations the dissolved metals(s) are recovered from solution by a variety of techniques, which may involve, for example, one or more of selective precipitation, solvent extraction ion exchange and electrowinning. This will typically be the case when pressure oxidizing base metal sulfide minerals, such as those containing, for example, nickel, copper, zinc and/or lead. If present, silver is also frequently dissolved during pressure oxidation operations.

Some metals, however, do not typically dissolve during pressure oxidation operations. For example, when processing sulfide gold ores, the gold typically does not dissolve and remains with solid residue from the pressure oxidation operation. The gold may then be recovered, for example, by leaching the solid residue with a leach solution containing a lixiviant for gold, such as a cyanide or thiosulfate lixiviant. In sulfide gold ores, the gold is typically contained in one or more iron-containing sulfide mineral, such as for example, pyrite, marcasite, aresenopyrite or pyrrhotite. Direct leaching of gold from these ores, such as direct cyanide leaching, typically results in only very low gold recovery. For this reason, these sulfide ores are often referred to as refractory sulfide gold ores. Recovery of gold from these refractory sulfide gold ores typically involves pretreatment of gold-bearing sulfide minerals to decompose at least a portion of the sulfide minerals to free the gold, thereby facilitating subsequent recovery of the gold by leaching the gold with a leach solution containing cyanide or some other lixiviant. The pretreatment may be performed, for example, on the whole ore, on a sulfide concentrate resulting from prior flotation operations, or on a blend of whole ore and ore sulfide concentrate. Pressure oxidation is one pretreatment technique in which the gold-bearing ore and/or concentrate, is contacted with oxygen gas in a reactor, called an autoclave, under high pressure to oxidize sulfide sulfur in the sulfide minerals thereby releasing gold for recovery. Typically, the sulfide sulfur is oxidized to a sulfate form in an acid environment.

Pressure oxidation operations frequently involve feeding a slurry of particulate ore and/or concentrate slurried in an aqueous liquid to the first compartment of a multi-stage, or a multi-compartment reactor. Oxygen gas is fed to one or more of the compartments of the multi-compartment reactor to effect the desired oxidation of sulfide sulfur for the purpose of freeing the metals of interest for recovery. As used herein, the terms "multi-stage" and "multi-compartment" are used interchangeably in reference to an autoclave, or other reactor, including one or more internal dividers separating the interior reactor volume into zones that progress in series of the general direction of flow through the reactor, with each such divider acting as at least a partial barrier to flow between adjacent zones. The terms "stage" and "compartment" are used interchangeably herein to refer to such a zone within a multi-stage reactor.

A significant expense associated with pressure oxidation is the cost of providing oxygen gas for use in the reactor. There is often significant inefficiency in the use of oxygen gas and it is, therefore, common practice to feed to the reactor a significant excess of oxygen gas over that stoichiometrically required for sulfide sulfur oxidation, with the excess oxygen gas being essentially wasted. Moreover, the oxygen gas is typically fed to the reactor in a gas stream that is substantially enriched in oxygen compared to air. Providing such a purified stream of oxygen gas typically requires building and operating an oxygen plant to prepare an oxygen-enriched gas stream from air, such as for example by membrane or cryogenic separation techniques, which is expensive.

Another frequent problem with current pressure oxidation operations is thermal inefficiency in the reactor. Oxidation of the sulfide minerals is exothermic, but maintenance of a minimum elevated temperature is required to attain acceptable reaction kinetics. Therefore, in many instances heat, often in the form of steam, is added to the first compartment of a multi-stage reactor to maintain an adequate temperature in the first stage, where the oxidation reaction is initiated. Conversely, in one or more subsequent stage of the reactor, it is often necessary to add water to prevent the occurrence of excessively high temperatures, with the quantity of water required increasing as more steam is added to the first compartment.

The addition of steam in the front-end of the reactor is undesirable because of the cost of generating the steam.

Also, as the steam condenses in the reactor it reduces the density of solids in a slurry and, therefore, the quantity of ore that may be processed through the reactor per unit time. The addition of water in the back-end of the reactor is likewise undesirable because the added water also dilutes the slurry and reduces the density of solids in the slurry, thereby further reducing potential ore through-put.

Another example of a chemical processing operation that involves intimate contact between multiple components is pressure leaching. Pressure leaching involves contacting a metal-containing material with a leach solution to dissolve at least a portion of one or more metal of interest. The pressure leaching is conducted in a reactor at elevated temperature and pressure to improve leach kinetics. Although the field of pressure leaching is not confined to mineral processing operations, many metal-bearing ores, and concentrates prepared by flotation of such ores, are processed by pressure leaching to dissolve one or more metals of interest into the leach solution. Mineral materials susceptible to processing by pressure leaching are typically oxide ores, and concentrates prepared from such ores. Unlike pressure oxidation, it is not necessary to oxidize a sulfide mineral to release the metals. Rather, the metals are directly leachable from the mineral material of interest. The leach solution used for pressure leaching may be acidic or alkaline, depending upon the materials involved and the specific circumstances. For example, either alkaline (e.g., ammoniacal) or acidic (e.g., sulfate) leach solutions may be used to pressure leach nickel or cobalt from laterite or saprolite ores. As another example, copper, platinum, palladium and gold may be pressure leached from oxide ores using an alkaline (e.g., ammoniacal) or an acidic (e.g., chloride) leach solutions. As a further example, tungsten and molybdenum may be pressure leached from oxide ores using alkaline leach solutions (e.g., solutions of sodium carbonate or sodium hydroxide). Moreover, zinc, uranium, vanadium and manganese may be pressure leached from oxide ores using acidic (e.g., sulfate) solutions. Furthermore, light metals, such as aluminum, may be pressure leached from oxide ores, such as bauxite ores, using an alkaline leach solution (e.g., sodium hydroxide solution).

A common feature of these and other pressure leaching processes is that it is generally desirable that the particulate mineral material be evenly dispersed throughout and intimately mixed with leach solution, and to actively agitate the mixture to promote enhanced contact a for improved leach kinetics. Agitation and mixing in current pressure leaching operations, however, could be more effective, especially in operations involving a highly viscous medium, as is typically the case with mineral processing operations.

In addition to pressure oxidation and pressure leaching operations, many other chemical processing operations involve agitation or mixing. This would be the situation, for example, in reaction systems involving dispersion of a gas phase throughout a liquid or a slurry, mixing of multiple liquids or mixing solids and liquid in a slurry. In these and other chemical processing operations, it would often be advantageous to conduct the operation with more efficient mixing of these materials, especially in high viscosity systems in which it can be particularly difficult to achieve and/or maintain a homogenous mixture.

There is a need for improved chemical processing techniques involving mixing of materials and apparatus for use therein. There is especially a need for pressure oxidation processes that more efficiently utilize expensive oxygen gas fed to the reactor and/or that operate in a more thermally efficient manner.

SUMMARY OF THE INVENTION

The present invention generally relates to chemical processing operations, and more particularly to such operations in which it is desirable to mix or otherwise agitate the contents within the internal reactor volume of a chemical reactor. Two particularly important applications for the present invention include pressure oxidation and pressure leaching applications, although the features of the present invention are equally applicable to other chemical processing operations as well. With respect to pressure oxidation and pressure leaching applications, the material being processed will generally involve a particulate mineral material feed, typically slurried in an aqueous liquid. The mineral material feed includes at least one metal value. As used herein, metal value refers to a metal component or components targeted for recovery from the mineral material feed. Such a mineral material feed may include a whole ore, an ore concentrate prepared from prior flotation operations, or a blend of the two. Also, the mineral material feed may be or include tailings or other solid residue from prior mineral processing operations. One preferred application for the present invention is in pressure oxidizing gold-bearing mineral material feed to free gold from association with at least one sulfide mineral with which gold is associated. Mineral material feed to the reactor can be any gold-bearing material containing gold in association with at least one sulfide material, for which it is desirable to decompose at least a portion of the sulfide mineral to facilitate gold recovery. These gold-bearing mineral materials are referred to as refractory sulfide materials when a significant portion of the gold cannot be recovered by direct leaching of the mineral material with a lixiviant for gold, such as by leaching with a cyanide, thiosulfate or other lixiviant. With the present invention, it has been found that reactor performance, and especially oxygen gas utilization efficiency, is often significantly improved during pressure oxidation of these gold-bearing refractory sulfide materials. In one application, the metal value of the mineral material includes one or more metal component in addition to gold. The other metal value could include any metal component in sufficient quantity to justify recovery. Examples of possible metals for such additional metal component include copper, nickel, zinc, lead, cobalt, vanadium, tungsten, molybdenum and silver. During pressure oxidation such an additional metal component would typically be dissolved into the liquid phase in the reactor, while the gold would remain in the solids. One preferred application involves pressure oxidation of gold-bearing copper sulfide mineral materials, with copper being recovered from the liquid phase and gold from solids discharged from the reactor. One preferred technique for recovering the copper is by solvent extraction.

A first aspect of the present invention generally relates to agitation of a mineral material slurry in a reactor in which a pressure oxidation operation or a pressure leaching operation is being effected to facilitate recovery of one or more metal components of interest. The mineral material feed is introduced into the reactor in a manner so that, in the reactor, the mineral material is in a slurry, typically with water or another aqueous liquid. In the case of pressure leaching, the liquid will typically be either acidic or alkaline leach liquid chosen to leach the metal(s) of interest from the mineral material feed. In the case of pressure oxidation, oxygen gas, typically under high pressure, is also introduced into the reactor for use as an oxidant to oxidize at least a portion of sulfide sulfur in the mineral material, thereby freeing one or more metal of interest for possible subsequent metal recovery operations. As previously noted, in pressure oxidation and pressure leaching operations, the reactor is typically referred to as an autoclave.

According to the first aspect of the invention, slurry present in the reactor is agitated during pressure oxidation by at least one agitator disposed in the reactor and operated to provide a pumping action in which portions of the slurry are continually drawn into and expelled from a cavity in the agitator. This pumping action is typically effected through rotation of at least a portion of the agitator in a manner to expel the slurry from the cavity in a generally radially outward direction, thereby creating a fluid suction within the cavity to draw additional slurry into the cavity for continuous cycling of slurry through the agitator while the rotation is continued.

Various refinements exist for features noted in relation to this first aspect of the present invention, and additional features may also be incorporated as well. These refinements and additional features may be incorporated individually or in any combination. In one refinement, the agitator has a fluid intake that is preferably axially aligned with a center of the noted cavity, and the agitator further has an axis of rotation that is aligned with the center of the cavity. Additional refinements involve directing a flow of the mineral material feed (and/or the oxygen gas in the case of pressure oxidation) toward a fluid intake of the agitator through which slurry is directed to the cavity. In a preferred embodiment, one or both of these flows are directed in a vertically upward direction toward the fluid intake. In one embodiment involving pressure oxidation, a flow of oxygen gas is introduced into the slurry within the reactor from an oxygen gas supply line in substantially vertical orientation located below the fluid intake so that oxygen gas exiting the oxygen gas supply line flows in a substantially vertically upward direction toward the fluid intake and the flow of mineral material feed is also directed in an upward direction toward the fluid intake, in a manner preferably designed so that the flow of mineral material feed intersects the corresponding flow of oxygen gas in the vicinity of the fluid intake. In the case of pressure oxidation, using these refinements, in combination with the pumping action of the agitator, dispersion of the oxygen gas throughout the slurry and dissolution of the oxygen gas into the slurry liquid are promoted, with a result that more efficient utilization of the oxygen gas to oxidize sulfide sulfur is typically achievable within the reactor.

It should be appreciated that the pressure oxidation or pressure leaching conducted in accordance with this first aspect of the invention will typically be performed in a multistage reactor (also referred to interchangeably as a multi-compartment reactor), with oxygen gas (in the case of pressure oxidation) typically being introduced into each of the stages (or compartments). Moreover, and as will be discussed in more detail below in relation to a second aspect of the present invention, mineral material feed may advantageously be introduced into more than one of the reactor stages to further enhance performance.

In one embodiment of the first aspect of the invention, the cavity of the agitator is defined between a pair of spaced, typically vertically spaced, partitions of an agitator pump. In one embodiment, the first and second partitions are disposed in at least substantially horizontal relation, with the entire first partition being disposed at a lower elevation than the entirety of the second partition. Other orientations could possibly be utilized for the first and/or second partitions. An aperture is formed in the first partition such that slurry in the reactor is drawn into the cavity of the agitator through the aperture. The aperture may be the fluid intake of the agitator through which slurry is drawn to supply the cavity. In one refinement, however, the agitator includes a pump inlet conduit or the like to provide a flow path through which slurry is drawn to be directed through the aperture and into the cavity. In this case, the fluid intake to of the agitator would be an open end of the pump inlet conduit, or the like, through which slurry is initially drawn into the agitator for fluid communication to the cavity. In one preferred embodiment, the pump inlet conduit projects at least generally downwardly toward the bottom of the reactor in an at least substantially vertical orientation and/or in axial alignment with the direction in which the flow of oxygen gas is introduced into the slurry in the reactor. Other configurations for the fluid intake of the agitator are also possible. Moreover, in the case of pressure oxidation, whether or not the agitator includes a pump inlet conduit, or the like, in a further refinement the oxygen gas is preferably introduced into the reactor at a location which is "close" to the fluid intake of the agitator. In one embodiment for pressure oxidation processing, the spacing between a discharge end of an oxygen inlet line and the corresponding fluid intake of the agitator is no larger than about 6 inches.

As noted, a pumping action of the agitator, wherein slurry is continuously drawn into and expelled from the cavity during operation of the agitator, is typically effected by rotation of at least a portion of the agitator. For example, the agitator may include a plurality of vanes that are rotated within the slurry in the reactor during pressure oxidation. The vanes typically extend in a direction generally radially outward and away from the cavity. When rotated about an axis of rotation extending substantially through the center of the cavity, the vanes help to expel fluid from the cavity in a generally radially outward direction and create a fluid suction to draw additional slurry into the cavity, thereby creating a pumping action. Shear at the outward edges of the rotating vanes, in combination with the pumping action of the agitator, is believed to enhance effective mixing of components and, in the case of pressure oxidation, dispersion of the oxygen gas throughout the slurry to promote efficient use of oxygen to oxidize sulfide sulfur. In one embodiment, the vanes are incorporated into the agitator so that each vane extends in a vertical direction at least between the first and second partitions (i.e., a portion of each vane may extend vertically beyond the first and/or second partition) and in a generally radially outward direction beyond the perimeter of the first partition and/or second partition. The vanes may each extend generally radially inward of a perimeter of the inlet aperture within the first partition in one embodiment (i.e., a portion of each vane may be disposed "over" the inlet aperture). Alternatively, the vanes may each terminate in a generally radially inward direction at a location not within a perimeter of the inlet aperture (i.e., no portion of the vanes is disposed "over" the inlet aperture).

A second aspect of the present invention generally relates to the manner in which mineral material feed is introduced into a reactor for pressure oxidation or pressure leaching, with mineral material feed being separately introduced at least two different locations within the reactor. At least a first flow of mineral material feed, typically in a slurry with an aqueous liquid, is introduced into the reactor at a first location (e.g., into a first compartment of a multi-stage reactor). At least a second flow of mineral material feed, also typically in a slurry with an aqueous liquid, is introduced into the reactor at a second location, which is spaced from the first location (e.g., into a second compartment of a multi-stage reactor). In a further embodiment of this second aspect of the invention, in the case of pressure oxidation, a flow of oxygen gas is directed into each of the compartments of a multi-stage reactor. In any case, slurry within the reactor is agitated for enhanced homogenization of the slurry and to promote intimate contact between reactants, preferably with each compartment of the reactor being independently agitated by at least one agitator disposed within each compartment.

Various refinements exist for features noted in relation to this second aspect of the present invention and additional features may also be incorporated as well. These refinements and additional features may be incorporated individually or in any combination. In one refinement, at least one of, and more preferably both of, the first and second flows of mineral material feed, are introduced into the reactor in an at least a generally upward direction (e.g., such that the flows are projected at an upward angle). Also, significant refinements are achievable through a combination of using the agitation of the first aspect of the invention in the vicinity of at least one, and preferably both, of the first and second flows of mineral material feed. For example, the agitation of the first aspect, optionally including any refinements thereto, may be advantageously implemented in first and second compartments of a multi-stage reactor in combination with the split mineral material feed of the second aspect of the invention. Portions of total mineral material feed to the reactor may be allocated between the first and second flows of mineral material feed in any desired manner. However, for enhanced performance it is generally preferred that at least about 25% of the total mineral material feed to the reactor be allocated to each of the first and second flows, and more preferably at least about 50% of total mineral material feed to the reactor is allocated to the first flow. In one embodiment, the total mineral material feed is split approximately equally between the first and second flows.

As noted, the reactor will often be a multi-stage reactor. Such a reactor has a plurality of stages, or compartments, arranged in series. One preferred reactor for use with the present invention includes four compartments. Flow in such a multi-compartment reactor proceeds from the first compartment in series to the second compartment in series, and so on through the last compartment in series. The processed slurry is then typically discharged from the last, or most downstream, compartment. These compartments are at least partially isolated from each other by a divider disposed between adjacent compartments in series. In one embodiment, slurry moves from one compartment to the next succeeding compartment in series by overflowing the divider or passing through a restricted opening through or adjacent to the divider. The divider is typically a wall or other partition, such as of metal construction. In one embodiment of the invention, the first flow of mineral material feed is introduced into the first compartment in series and the second flow of mineral material feed is introduced into the second compartment in series.

In the case of pressure oxidation, conventional operation is to introduce mineral material feed into only the first in series of the compartments, with oxygen gas typically being added to each of the compartments, so that the oxidation of sulfide minerals proceeds to a greater extent as the slurry moves from compartment to compartment through the reactor. In a preferred embodiment of pressure oxidation of the present invention, however, mineral material feed is introduced into at least each of the first and the second compartments in series, and introduction of oxygen gas is adjusted accordingly. This has been found advantageous from both the perspectives of thermal efficiency and oxygen utilization. In conventional pressure oxidation, when mineral material feed is introduced only into the first compartment, heat generated in the first compartment from the exothermic oxidation reaction is not sufficient for autothermal operation, and it is therefore often necessary to add heat, typically in the form of steam, to the first compartment to maintain the first compartment at a sufficiently high temperature. In later compartments, however, as the oxidation reaction progresses, cooling is often required to avoid excessive temperatures. Such cooling is often accomplished by adding water in one or more of the later compartments. The effect of adding steam in the first compartment and water in later compartments is that the density of the slurry in the reactor is reduced, and therefore also throughput of mineral material is reduced.

By splitting the mineral material feed between the first compartment and the second compartment during pressure oxidation, less steam is required in the first compartment due to a reduction in feed to the first compartment that must be heated to reaction temperature. Furthermore, the retention time in the first compartment is increased, which in turn increases the extent to which sulfides are oxidized in the first compartment, resulting in higher heat production in the first compartment per unit of mineral material feed to the first compartment and further reducing steam requirements in the first compartment. Hot slurry flowing from the first compartment into the second compartment often provides sufficient heat to maintain the temperature in the second compartment at the desired elevated reaction temperature, even with the introduction of the second flow of mineral material feed into the second compartment. In some instances, it may be desirable to provide some supplemental heating from an outside heat source, such as by steam addition. Even if such supplemental heating is required in the second compartment, the total supplemental heat to the reactor will typically be significantly lower than required in the conventional situation, in which mineral material feed is introduced into only the first compartment. Performance in specific instances will depend, of course, upon the sulfide sulfur content of the mineral material being processed and the specific conditions under which the pressure oxidation is being operated. An additional benefit from splitting total mineral material feed between first and second compartments is that it is often also possible to reduce water additions to prevent excessive temperatures in downstream compartments. Furthermore, the enhanced thermal characteristics in the first and second compartments are believed to promote efficient utilization of oxygen gas fed at the reactor during pressure oxidation.

In a particularly preferred implementation of the invention, the first and second aspects are combined. For example, mineral material feed may be introduced into the first two compartments of a multi-stage reactor according to the second aspect of the invention, and the agitation of the first aspect may beneficially be implemented in the first and/or second compartments, and optionally also in other compartments. In the case of pressure oxidation, by reducing steam and water additions by splitting the mineral material feed between compartments, it is typically possible to process a higher density slurry through the reactor, while the pumping agitation promotes efficient utilization of oxygen gas to adequately oxidize sulfide minerals in the higher density slurry.

In the case of pressure oxidation, with each of the first and second aspects of the present invention, oxygen gas is typically introduced into multiple compartments, and preferably into each of the compartments of a multi-stage reactor. However, a greater portion of total oxygen gas fed to the reactor is typically introduced into each compartment into which mineral material feed is introduced, and a lesser portion is introduced into each compartment in which no mineral material feed is introduced. In the case of the second aspect of the invention, when the mineral material feed is split between compartments, it is preferred that the relative quantities of oxygen gas introduced into each of those compartments be approximately in proportion to the relative quantities of mineral material feed introduced into each of those compartments. For example, when 50% of the total mineral material feed is introduced into each of the first and second compartments during pressure oxidation, oxygen gas feed to each of the first and second compartments should be approximately equal, with perhaps about 45% of the total oxygen gas being fed to each of those compartments and the third and fourth compartments each receiving perhaps only 5% or less of the total oxygen gas.

A third aspect of the present invention generally relates to the manner in which the slurry is agitated within a reactor during pressure oxidation or pressure leaching operations. This system includes a mineral material feed system for providing a mineral material feed to a reactor, and an appropriate metal recovery system to receive reactor discharge from the reactor for the purpose of recovering one or more metal from the reactor discharge. In the case of pressure oxidation of a gold-bearing refractory material, the metal recovery system involves operations for recovering gold from solid residue of the reactor discharge (e.g., via cyanide, thiosulfate or other leaching of the gold). The reactor includes a pressure vessel having a plurality of fluid connections. There is at least one mineral material feed inlet for introducing mineral material feed into the pressure vessel and at least one discharge outlet for discharging processed slurry from the pressure vessel. In the case of pressure oxidation, the reactor also includes at least one oxygen gas feed inlet for introducing oxygen gas into the pressure vessel from an appropriate oxygen supply system, and the processed slurry will be an oxidized slurry.

The reactor of this third aspect of the invention also includes at least one agitator pump, of the type previously noted with respect to the first aspect of the invention, disposed at least partially inside of the pressure vessel. This agitator pump typically includes a drive shaft, a pair of vertically spaced first and second partitions, and a plurality of vanes. Preferably, at least a portion of at least one, and more preferably each of, these vanes interfaces with and extends between the first and second partitions. The first partition includes at least one inlet aperture which effectively defines an inlet to the space between the first and second partitions, or stated another way this inlet aperture defines a pump inlet.

Various refinements exist for the features noted in relation to this third aspect of the present invention and further features may also be incorporated in this third aspect of the present invention as well. These refinements and additional features may exist individually or in any combination. The reactor may have multiple stages. Preferably, at least one agitator pump is used in each of these stages. By including multiple stages, the various combinations of features discussed above in relation to the second aspect of the present invention may be used in combination with this third aspect of the present invention as well (e.g., simultaneously introducing the mineral material feed into at least two different compartments of a multi-stage reactor).

The vanes associated with the third aspect of the invention need not be confined to the space between the first and second vertically spaced partitions. For instance, the vanes may extend radially beyond a perimeter of one or more of the first and second partitions, the vanes may extend vertically beyond the first partition in a direction which is at least generally away from the space between the first and second partitions, the vanes may extend vertically beyond the second partition in a direction which is at least generally away from the space between the first and second partitions, or any combination thereof. Any portion of the vanes which extends vertically beyond the first and/or second partition in a direction which is at least generally away from the space between the first and second partitions may be disposed entirely radially beyond a perimeter of the adjacentmost partition or may be disposed in at least partial vertical alignment with the adjacentmost partition (e.g., by disposing the first and/or second partition within a notch or the like which is formed in the vanes).

The spacing between the first and second partitions may be characterized as defining a pump cavity, of sorts, and which is accessed by the inlet aperture in the first partition. In one embodiment the first and second partitions are each disposed in at least substantially horizontal relation, with the first partition being disposed at a lower elevation than the second partition. The inlet aperture in this case projects toward a bottom of the pressure vessel. In one embodiment a pump inlet conduit interfaces with the first partition in alignment with the first inlet aperture and extends at least generally downwardly toward the bottom of the reactor, preferably in at least substantially vertical relation.

In the case of pressure oxidation, oxygen gas that is introduced into the pressure vessel is preferably directed at least generally upwardly and toward a fluid intake of the agitator. More preferably, an oxygen gas supply line is axially aligned with a center of the inlet aperture and/or the inlet conduit in a vertical orientation. Similarly, preferably the mineral material feed that is being introduced into the pressure vessel of the reactor is directed at least generally upwardly and toward the fluid intake of the agitator. Disposing an oxygen gas discharge line and a corresponding mineral material feed discharge line sufficiently close to a fluid intake further promotes intimate mixing of oxygen gas and mineral material via the agitator pump. In one embodiment, a vertical spacing between the discharge end of the oxygen gas supply line and the fluid intake of the agitator is preferably more than about 6 inches.

A fourth aspect of the present invention generally relates to the manner in which mineral material feed is introduced into a reactor for pressure oxidation or pressure leaching. This system includes a mineral material feed system for providing mineral material feed to a reactor and an appropriate metal recovery system to receive reactor discharge for purposes of recovering one or more metal form the reactor discharge. The reactor includes a pressure vessel having at least two compartments. At least one agitator is disposed in each of first and second compartments. There is at least a first mineral material feed inlet for introducing mineral material feed directly into the first compartment of the pressure vessel, and there is at least a second slurry feed inlet for introducing mineral material feed directly into the second compartment of the pressure vessel, preferably simultaneously with the introduction of mineral material feed into the first compartment. There is also at least one discharge outlet for discharging processed slurry from the pressure vessel to be received by the metal recovery system. In the case of pressure oxidation, the pressure vessel also includes at least one oxygen gas inlet for introducing oxygen gas into the pressure vessel from an appropriate oxygen gas supply system.

Various refinements exist for the features noted in relation to this fourth aspect of the present invention and further features may also be incorporated in fourth aspect of the present invention as well. These refinements and additional features may exist individually or in any combination. The mineral material feed may be introduced into one or both of the first and second compartments in a generally vertically upward direction of flow, generally directed at a corresponding agitator. In one embodiment, a first mineral material feed supply line extends within the pressure vessel along at least a portion of the bottom thereof and includes a discharge end portion that extends away from the bottom to direct the first flow of mineral material feed into the first compartment, and a second mineral material feed supply line extends within the pressure vessel along at least a portion of the bottom thereof and includes a discharge end portion that extends away from the bottom to direct the second flow of mineral material feed into the second compartment. Any design for providing the first mineral material slurry to each of these first and second mineral material feed supply lines may be utilized. For instance, a single main supply line could penetrate the pressure vessel and be directed along the bottom portion of the pressure vessel and the first and second mineral material feed supply lines could extend upwardly therefrom. Also, those various combinations of features discussed above in relation to the third aspect of the present invention may also be utilized by the subject fourth aspect of the present invention.

A fifth aspect of the present invention generally relates to the manner in which mineral material feed is introduced into a reactor for pressure oxidation or pressure leaching.

This system includes a mineral material feed system for providing mineral material feed to a reactor and an appropriate metal recovery system to receive reactor discharge for purposes of recovering one or more metal from the reactor discharge. The reactor includes a pressure vessel having at least one compartment, and preferably at least two compartments. At least one agitator is disposed in each such compartment of the reactor. There is at least one mineral material feed inlet for introducing the mineral material feed into the reactor in a generally upward direction, preferably directed generally upward in a direction toward an agitator. There is also at least one discharge outlet for discharging processed slurry from the pressure vessel to be received by the recovery system. In the case of pressure oxidation, the pressure vessel also includes at least one oxygen inlet for introducing oxygen into the pressure vessel from an appropriate oxygen supply system for effecting the pressure oxidation operation.

Various refinements exist for the features noted in relation to this fifth aspect of the present invention and further features may also be incorporated in the subject fifth aspect of the present invention as well. These refinements and additional features may exist individually or in any combination. Those various combinations of features discussed above in relation to the third aspect of the present invention may be utilized by the subject fifth aspect of the present invention. Similarly, those various combinations of features discussed above in relation to the fourth aspect of the present invention may be utilized by the subject fifth aspect of the present invention as well.

A sixth aspect of the invention generally relates to mixing multiple components of a flowable medium, in which the agitating aspect of the invention is applied generally to mix a contained volume of such a flowable medium.

A seventh aspect of the invention generally relates to dispersing a material in a flowable medium, in which the agitating aspect of the present invention is applied generally to disperse a material introduced into a contained volume of such a flowable medium.

An eighth aspect of the invention generally relates to dispersing a reactant in a flowable medium, in which the agitating aspect of the present invention is applied generally to disperse in a contained volume of a flowable medium a chemical reactant introduced into the flowable medium.

A ninth aspect of the invention generally relates to a chemical reactor that implements an agitator to agitate contents that may be contained within the internal reactor volume.

Moreover, any of the features of any of these or other aspects of the invention discussed herein may be combined in any compatible combination with any other of features of any other aspect or aspects of the invention.

DETAILED DESCRIPTION OF THE INVENTION

Figure 1:
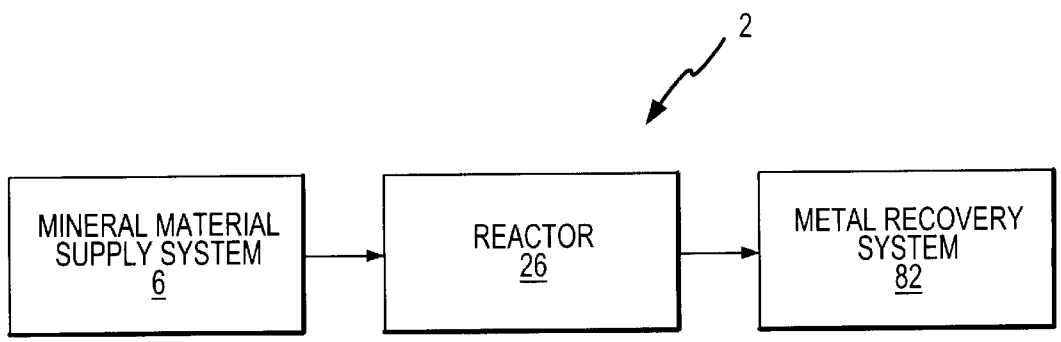
FIG. 1 is a schematic of one embodiment of a mineral processing system which may utilize one or more aspects of the present invention.

The present invention will be described in relation to the accompanying drawings which at least assist in illustrating its various pertinent features. A block flow diagram of one embodiment of a mineral processing system 2 is generally illustrated in FIG. 1, and which may be utilized for executing both batch and continuous processing operations, as well as any hybrid thereof The mineral processing system 2 includes a mineral material supply system 6 which provides a supply of an appropriate mineral material slurry to a reactor 26, typically in the form of a continuous flow. There are a number of key features which may be implemented by the reactor 26, alone or in combination, and which will be discussed in more detail below in relation to FIGS. 2–7.

The operation performed on the mineral material in the reactor 26 is in preparation of metal recovery in a metal recovery system 82. The operation performed in the reactor 26 may be, for example, pressure oxidation to free one or more metals from sulfide minerals in mineral material feed. As another example, the operation performed in the reactor 26 may be pressure leaching of the mineral material to dissolve one or more metal of interest into a leach solution. In any event, a discharge from the reactor 26 is directed to the metal recovery system 82, where at least one metal of interest is recovered from the discharge. Any type of metal recovery technique/apparatus may be utilized by the metal recovery system 82 that is appropriate for the metal of interest. For example, when recovering gold from solid residue discharged from the reactor 26, the metal recovery system 82 may, include lixiviation of the gold with a leach solution including a dissolved cyanide, thiosulfate or other lixiviant for gold, which may be followed by an electrowinning or some other technique for preparing a purified gold product. As another example, the metal(s) of interest may be dissolved in a liquid phase discharged from the reactor, as is the case, for example, with pressure oxidation of base metals and pressure leaching. Any of a variety of operations may be performed during the recovery of the metal(s) of interest from solution, including one or more of ion exchange, solvent extraction, selective precipitation and electrowinning.

Only the basics of the mineral processing system 2 have been illustrated in FIG. 1, and it should be understood that a variety of specific processing actions may be performed in any of the steps depending upon the particular application. For instance, the mineral material feed supply system 6 will typically include comminution of a mineral material (e.g., crushing and/or grinding) before being slurried with an appropriate liquid (e.g., aqueous liquid). Furthermore, the supply system 6 could include a flotation operation to prepare a sulfide concentrate to be used as or as part of the mineral material feed to the reactor 26. Also for instance, the metal recovery system 82 may include, without limitation, one or more of reducing the temperature of the discharge from the reactor 26, conditioning of the discharge (e.g., pH adjustment), and/or one or more liquid/solid separations.

The mineral material feed to the reactor 26 will typically be in particulate form of any convenient size for processing through the reactor 26. For many applications, the mineral material feed will be sized so that at least about 80% of the mineral material feed is smaller than about 200 mesh (i.e., P80 size of 200 mesh or smaller). As fed to the reactor 26, the mineral material feed will be in a slurry with water. The feed slurry, may have any solids content that is convenient for processing through the reactor 26. Typically the slurry will have a solids content of at least about 20 weight percent solids, and more often from about 35 weight percent to about 55 weight percent solids. Various features are utilized in relation to the reactor 26 to enhance one or more aspects of the chemical processing operation occurring in the reactor 26, as noted, and is discussed below in more detail. The temperature and pressure conditions in the reactor 26 will depend upon the mineral material that is being processed and the specific operation being performed. In the case of pressure oxidation and pressure leaching operations, the reactor 26 will be operated at high pressures, frequently in excess of 100 psig (689 kPa), and at a high temperature, frequently in excess of 100° C. Unless otherwise specified, all listed pressures are gauge pressure, and not absolute pressures. For example, when pressure oxidizing a sulfide gold ore or concentrate, the temperature will typically be higher than about 160° C., and more often in a range of from about 180° C. to about 240° C. Furthermore, for pressure oxidation operations, Oxygen gas will typically be fed to the reactor 26 at an over pressure (i.e., over and above vapor pressure exerted by the aqueous liquid in the reactor 26) of at least about 10 psi (69 kPa) and more often in a range of from about 25 psi (172 kPa) to about 100 psi (689 kPa). The metal recovery system 82 will typically entail a cooling system to reduce the reactor discharge slurry to a suitably low temperature for metal recovery operations, which is often to a temperature of lower than about 50° C.

Figure 2:
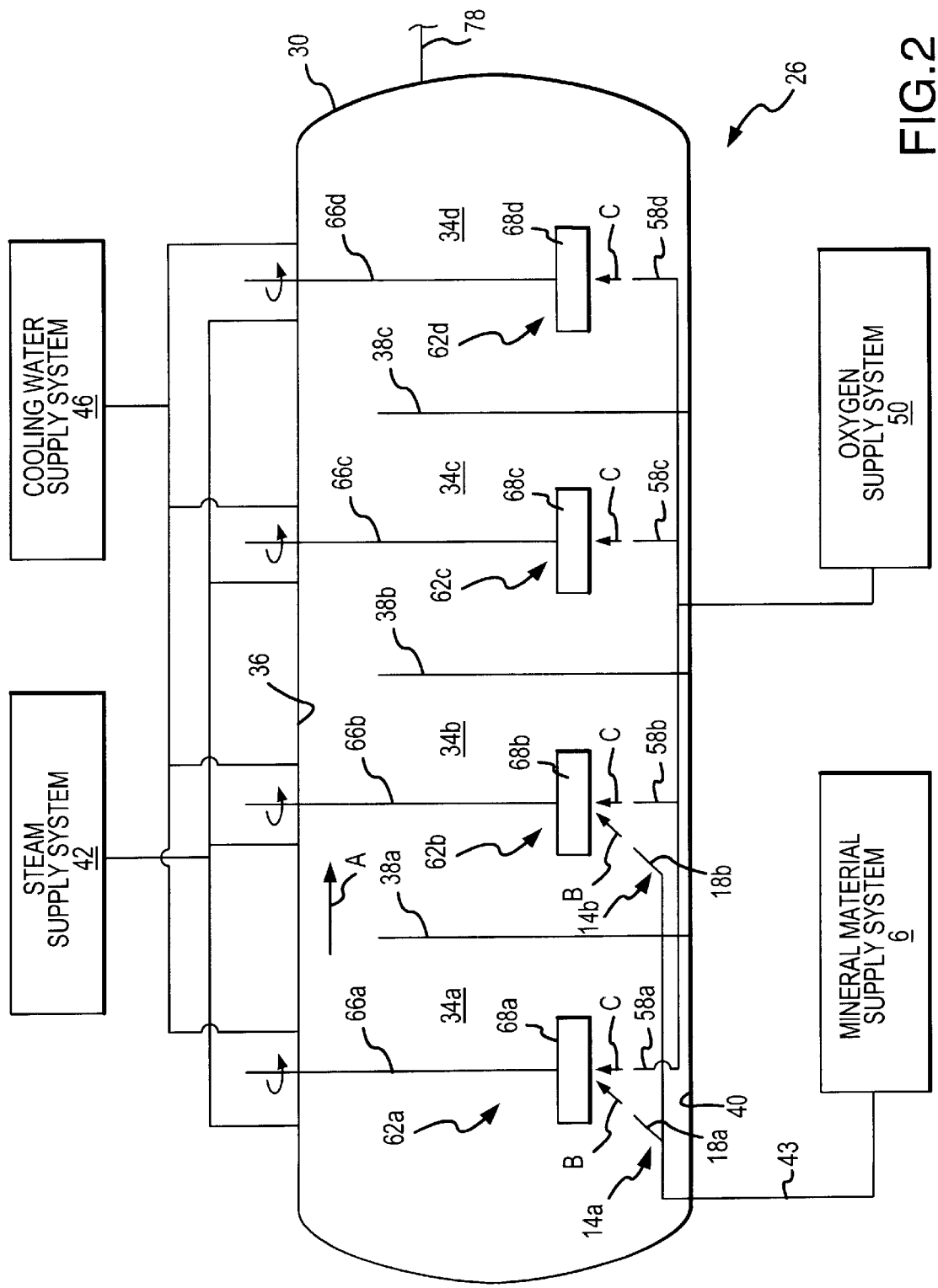
FIG. 2 is a schematic showing one embodiment of a pressure oxidation reactor, or autoclave, that may be utilized with the mineral processing system of FIG. 1, and which includes various aspects of the present invention.

Reference is now made to FIG. 2, which illustrates the details of one embodiment of the reactor 26 that may be used in the mineral processing system 2 of FIG. 1 when a pressure oxidation operation is to be performed in the reactor 26. Although the reactor 26 as described with reference to FIG. 2 is specifically designed for pressure oxidation, features described concerning agitation and feeding materials into the reactor 26 in relation to one or more agitators disposed in the reactor 26 are equally applicable to pressure leaching operations and to other mineral processing operations involving mixing of components.

The reactor 26 as shown in FIG. 2 is a four-stage reactor and generally includes an appropriately configured/sealed pressure vessel 30 having a bottom 40 and a vertically spaced top 36. The interior of the pressure vessel 30 includes a plurality of longitudinally-spaced dividers 38 which extend upwardly from the bottom 40 and which separate the interior of the pressure vessel 30 into stages or compartments 34. "Longitudinal" in this context means at least generally in the direction of slurry flow through the pressure vessel 30, and which longitudinal direction is represented by the arrow "A" in FIG. 2. The noted dividers 38 are spaced from the top 36 to provide an opening above the top of the dividers 38 for flow of slurry between adjacent compartments 34, in the direction of the arrow "A", progressing from the first compartment 34a to the second compartment 34b, then to the third compartment 34c and finally to the fourth compartment 34d.

An agitator 62 is disposed in each of the compartments 34a–d of the reactor 26. Only a schematic representation of the agitator 62 is provided in FIG. 2. Details regarding a number of preferred configurations for the agitator 62, providing an enhanced pumping agitation function and enhancing efficiency of oxygen utilization, are addressed below in relation to FIGS. 3–7. Each agitator 62 generally includes an agitating member 68 and an agitator drive shaft 66 which is appropriately fixedly interconnected therewith. Rotation of the agitating member 68 of each agitator 62 is effected by appropriately interconnecting each the agitator drive shaft 66 with an appropriate agitator drive assembly (not shown). Any way of rotating each of the agitators 62 may be utilized/implemented by the agitator drive assembly. For instance, each of the agitators 62 could be rotated by a common source, or each agitator 62 could be rotated by its own source. Typically, each agitator 62 is independently driven by a separate motor associated with each agitator 62. Moreover, one or more of the agitators 62 may be rotated at the same or different speeds. In one embodiment, each of the agitators 62 are rotated at substantially the same rotational velocity.

There are a number of different flows which are directed into the pressure vessel 30. One of these flows is a slurry including the mineral material feed 43 provided by the mineral 33 material feed supply slurry system 6. Instead of only providing a single flow of the mineral material slurry to the reactor 26 in the manner of the known prior art, the mineral material feed supply system 6, as shown in FIG. 2, simultaneously directs a portion of the mineral material feed into each of the first compartment 34a and the second compartment 34b. In this regard, the mineral material feed supply system 6 includes a first slurry supply line 14a and a second slurry supply line 14b, which are disposed in the first compartment 34a and the second compartment 34b, respectively. How the mineral material feed is actually directed from the mineral material feed supply system 6 to each of the first slurry supply line 14a and the second slurry supply line 14b is not of particular importance. In this regard, the mineral material slurry supply system 6 contemplates: 1) directing a single feed inlet conduit from the mineral material feed supply system 6 through a wall of the pressure vessel 30 for fluidly interconnected with each of the first slurry supply line 14a and the second slurry supply line 14b; 2) using a single pump to direct a flow of the mineral material slurry that is split between the first slurry supply line 14a and the second slurry supply line 14b; 3) using appropriate valving to allow for metering of and/or otherwise controlling the flow/flow rate through each of the first slurry supply line 14a and the second slurry supply line 14b; 4) and having the first slurry supply line 14a being in independent fluid interconnection with the mineral material feed supply system 6 and with the flow being directed therethrough by a first pump or the like, and having the second slurry supply line 14b being in independent fluid communication with the mineral material feed supply system 6 and with the flow being directed therethrough by a second pump or the like, such that there would be two penetrations of the pressure vessel 30 to introduce the mineral material feed (e.g., two slurry feed inlet conduits passing through the wall of the pressure vessel 30). In one embodiment, a single slurry feed inlet conduit passes through a wall of the pressure vessel 30, extends at least generally along the bottom 40 of the pressure vessel 30 within the first compartment 34a and at least generally in the direction of the arrow "A", extends through the first divider 38a, and thereafter extends at least generally along the bottom 40 of the pressure vessel 30 within the second compartment 34b. Each of the first slurry supply line 14a and the second slurry supply line 14b "tap into," or are fluidly interconnected with, this single slurry feed inlet conduit in this instance.

Regarding the relative magnitudes of flow rates of mineral material feed through each of the slurry supply lines 14a and 14b, typically from about 10 percent to about 90 percent of the feed is introduced into the first compartment 34a and the remaining into the second compartment 34b. In a preferred embodiment, at least about 25 weight percent, and more preferably at least about 50 weight percent, of the total mineral material feed is introduced into the first compartment 34a. For example, in one embodiment, about 55 weight percent of the total mineral material feed is introduced into the first compartment 34a and about 45 weight percent of the total mineral material feed is introduced into the second compartment 34b. It should be appreciated that a portion of the mineral material feed could be introduced into compartments 34c and/or 34d, but such an operation is generally not preferred.

Introducing a separate flow of mineral material feed into each of the first compartment 34a and the second compartment 34b enhances one or more aspects of the pressure oxidation that occurs within the reactor 26. Other aspects in relation to introduction of the mineral material feed into the reactor 26 further enhance one or more aspects of the present invention. FIG. 2 clearly illustrates that the slurry supply lines 14a and 14b each direct a separate flow of the mineral material slurry into the reactor 26 in an at least generally upward direction with the flow being introduced into the reactor 26 at an upward angle relative to horizontal so that the flow is at least generally toward the top 36 of the pressure vessel 30, as illustrated by each arrow "B". The upwardly directed flow of mineral material feed is effected in the reactor of FIG. 2 by having a discharge end portion 18a and 18b of each of the slurry supply lines 14a and 14b extend at least generally away from the bottom 40 of the pressure vessel 30 at an upward angle relative to horizontal, preferably at an acute angle relative to horizontal. The discharge end portion 18 of each slurry supply line 14 is typically disposed at an upward angle typically in a range of from about 5 degrees and about 90 degrees relative to horizontal, with an upward angle of at least about 30 degrees relative to horizontal being preferred, and with an upward angle of from about 30 degrees to about 60 degrees being even more preferred. In one preferred embodiment, the upward angle of the direction of the discharge end 18 is at an upward angle of about 45 degrees relative to horizontal. Not only is the discharge end portion 18 of each slurry supply line 14 and corresponding flow of mineral material feed directed at least generally upward, but the flows of mineral material feed are at least generally upward in a direction toward the corresponding agitator member 68 (i.e., member 68a corresponding with supply line 14a in compartment 34a, etc.). Preferably the discharge end 18 of each slurry supply line 14, and also the corresponding flow of mineral material feed, is at least generally directed at a fluid intake of the corresponding agitator 62.

Another flow introduced into the reactor 26 is oxygen gas from an oxygen supply system 50 fluidly interconnected with the interior of the pressure vessel 30 to introduce oxygen gas into the pressure vessel 30 at one or more location, and more preferably at a plurality of different locations. In the illustrated embodiment shown in FIG. 2 there is an oxygen supply line 58 disposed in each of the compartments 34a–d with each oxygen supply line 58 being appropriately fluidly interconnected with the oxygen supply system 50.

Oxygen is thereby preferably directed into the slurry within each compartment 34 of the reactor 26. The oxygen supply system 50 contemplates: 1) directing a single oxygen feed inlet conduit from the oxygen supply system 50 through a wall of the pressure vessel 30 for fluid interconnection with each of the oxygen supply lines 58; 2) using a single pressure source to direct a flow which is split between the oxygen supply lines 58; 3) using appropriate valving to allow for metering of and/or otherwise controlling the flow/flow rate through each of the oxygen supply lines 58; and 4) having each of the oxygen supply lines 58 being independently fluidly interconnected with their own oxygen source and which would collectively define an oxygen supply, such that there would possibly be 4 penetrations of the pressure vessel 30 by the oxygen supply system 50 (e.g., four oxygen feed inlet conduits which would pass through the pressure vessel 30). In one embodiment, a single oxygen feed inlet conduit passes through a wall of the pressure vessel 30, extends at least generally along the bottom 40 of the pressure vessel 30 within the each of the compartments 34 and at least interconnected therewith.

Although it is possible to feed air to the reactor to introduce the oxygen gas into the reactor, it is preferred that the oxygen gas is introduced in a gas stream substantially enriched in oxygen gas relative to air. The oxygen supply system 50 may include compressed oxygen gas storage to supply the oxygen gas, or, preferably, an oxygen plant that produces an oxygen-enriched gas stream from air. The oxygen plant may employ any technique for producing the oxygen-enriched gas stream, such as for example membrane or cryogenic separation.

Regarding the relative magnitudes of flow rates of oxygen gas through each of the oxygen supply lines 58, typically a larger portion of total oxygen gas introduced into the reactor 26 is introduced into those compartments 34 into which mineral material feed is also introduced (compartments 34*a* and 34*b* in the embodiment shown in FIG. 2). Preferably, the allocation of oxygen gas feed between the compartments that receive mineral material feed (i.e., compartments 34*a* and 34*b* in FIG. 2) is in proportion to the allocation of total mineral material feed between the same compartments. Therefore, for example, when the two compartments 34*a* and 34*b* each receive equal quantities of mineral material feed, they also preferably each receive equal quantities of oxygen gas. For example, when 50 percent of total mineral material feed is introduced into each of the first and second compartments 34*a* and 34*b*, compartments 34*a* and 34*b* might each be allocated an equal oxygen gas flow of about 46 percent of the total oxygen gas, the third compartment 34*c* might be allocated about 5 percent of the total oxygen gas, and the fourth compartment 34*d* might be allocated only about 3 percent of the total oxygen gas. Splitting total mineral material feed between compartments 34*a* and 34*b*, and adjusting oxygen gas input into compartments 34*a* and 34*b* accordingly, significantly promotes attainment of efficient oxygen gas utilization in the reactor 26.

There are also a number of important features shown in FIG. 2 representing refinements in relation to how oxygen gas may be introduced into the reactor 26. One such feature is that the flow of oxygen gas is introduced into each the compartments 34 in an at least generally upward direction, meaning that, the flow is introduced into the reactor 26 at an upward angle relative to horizontal so that the flow is at least somewhat vertically inclined. As shown in FIG. 2, the oxygen gas flow is directed substantially vertically upward, as illustrated by the arrows "C" in FIG. 2, which is the most preferred orientation for oxygen gas flow. The upwardly directed flow is effected in the reactor of FIG. 2 by having discharge portions of oxygen supply lines 58 extend at least generally away from the bottom 40 of the pressure vessel 30 at an upward angle relative to horizontal. The discharge end portions of the oxygen supply lines 58, and therefor also the direction of flow of the oxygen gas in the reactor 26, is typically disposed at an upward angle relative to horizontal of from about 5 degrees to about 90 degrees, preferably from about 30 degrees to about 90 degrees, more preferably from about 45 degrees to about 90 degrees, and most preferably at about 90 degrees (so that the flow of oxygen gas is directly vertically upward, as shown in FIG. 2). Another refinement shown in FIG. 2 is that the flow of oxygen gas out of each of the oxygen supply lines 58 is directed at least generally upward toward the corresponding agitator member 68 (i.e., the agitator member 68*a* corresponding with oxygen supply line 58*a* in compartment 34*a*, etc.). More preferably, the discharge end portion of each oxygen supply line 58, and also the direction of oxygen gas flow, are axially aligned with the center of the corresponding agitator 62, which typically also corresponds with the rotational axis of the corresponding agitator 62, as defined by the agitator drive shaft 66.

Maintaining certain relative relationships involving the oxygen supply lines 58 further promote efficient oxygen utilization by the reactor 26. Disposing the end of each oxygen supply line 58 at least relatively close to its corresponding agitator 62 enhances oxygen uptake by the agitator to promote effective dispersion of the oxygen in the slurry. In one embodiment, the end of each oxygen supply line 58 is separated from its corresponding agitator 62 by a distance of no larger than about 12 inches, and preferably by no larger than about 6 inches. Moreover, the relative positioning of discharge end portions of the slurry supply lines 14 and oxygen supply lines 58 is important to enhanced performance. Preferably, each slurry supply line 14 and the corresponding oxygen supply line 58 are oriented such that the corresponding flows of mineral material feed and oxygen gas in a compartment 34 are directed along lines that intersect in the vicinity of the corresponding agitator 62, and more preferably in close proximity to a fluid intake to the corresponding agitator 62. This intersection will typically be at or below a fluid intake located on the vertical bottom of the agitator 68. Intersection of corresponding flows of mineral material feed and oxygen gas in close proximity to a fluid intake of the corresponding agitator 62 significantly promotes dispersion of oxygen gas by the agitator 62 and thereby also promotes efficient utilization of oxygen during pressure oxidation. Furthermore, in one embodiment, the discharge end of each slurry supply line 14 is disposed at about the same vertical elevation as the discharge end of the corresponding compartment oxygen supply line 58.

In addition to efficient use of oxygen gas, operation of the reactor 26 as shown in FIG. 2 also provides advantages in relation to thermal efficiency, which can permit processing of higher throughputs, as previously discussed. In many cases, it is necessary to add supplemental heat to at least the first compartment 34*a* from an external source to achieve the desired reaction temperature. This is especially the case when processing a mineral material feed containing a low sulfide sulfur content. This external heat may be supplied from a steam supply system 42, as shown in FIG. 2, that is fluidly interconnected with the interior of the pressure vessel 30 in an appropriate manner to permit the introduction of stream into the reactor at one or more locations. Furthermore, just as it is often necessary to add heat to one or more upstream compartment 34 (e.g., one or more of compartments 34*a* and 34*b*), so also it is often necessary to cool one or more downstream compartment 34 (e.g., one or more of compartments 34*c* and 34*d*), to prevent the temperature in such downstream compartment(s) from becoming excessively high. This may be accomplished by the addition of water to one or more of the downstream compartments 34 from a cooling water supply system 46, as shown in FIG. 2, fluidly interconnected with the interior of the pressure vessel 30 in a appropriate manner to permit the introduction of water into the reactor 26 at one or more locations to reduce the temperature during pressure oxidation. Furthermore, the more steam that is added into one or more upstream compartments 34 of the reactor, the more water will be required for cooling of one or more downstream compartments 34. With the present invention, steam additions from the steam supply system 42 can typically be reduced, and so also can water additions from the cooling water supply system 46 be reduced, providing further advantages with the present invention. As noted previously, by splitting total mineral material feed between the first and second compartments 34*a* and 34*b*, lower steam and water additions are typically achievable.

One benefit from reducing the additions of steam and/or water is that the operational cost of generating the steam for heating and/or providing the water for cooling is reduced. An often more important benefit, however, is that lower stream and/or water additions permit a higher density slurry (i.e., slurry containing higher solids content) to be processed through the reactor 26, thereby increasing the quantity per unit time of mineral material feed that may be pressure oxidized. This is because steam and water additions dilute the density of the slurry in the reactor 26, which has the effect of reducing the rate at which feed slurry can be introduced into the reactor 26.

Figure 3:
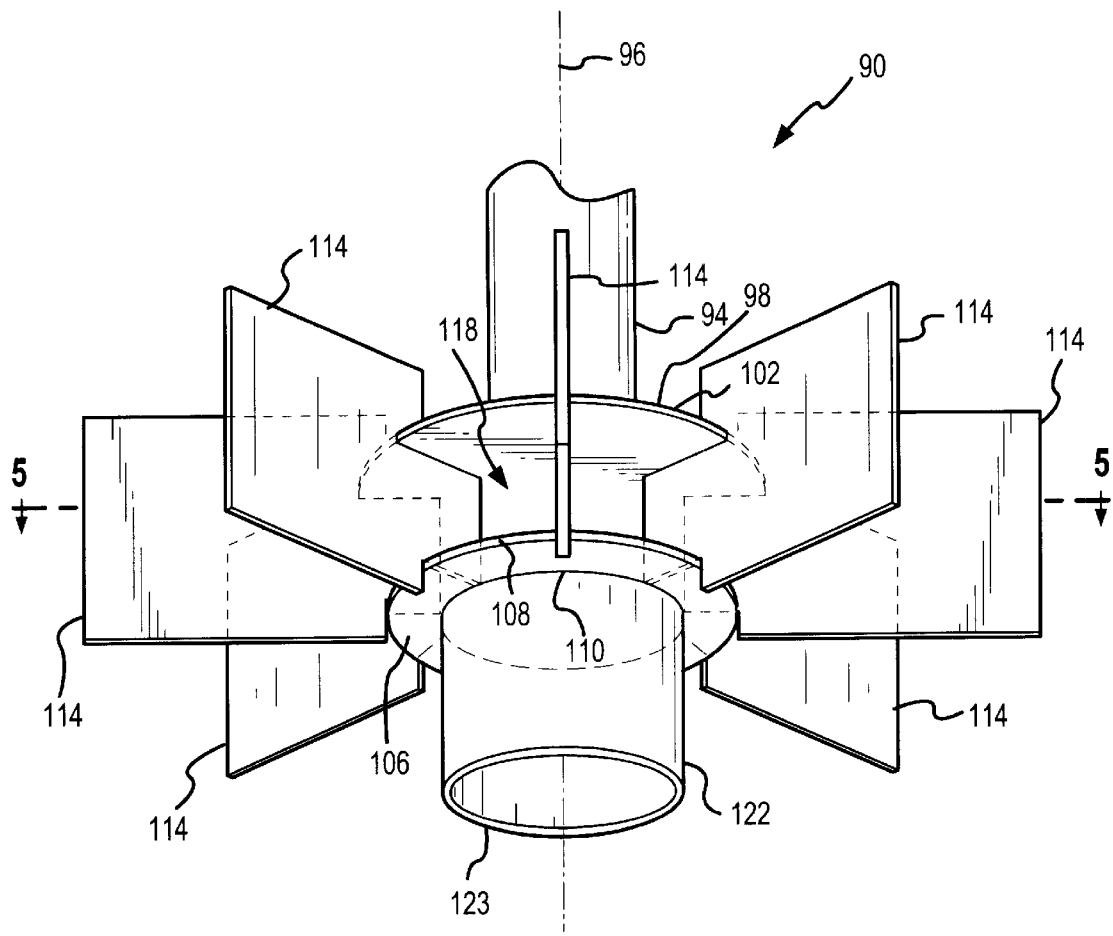
FIG. 3 is a perspective view of one embodiment of an agitator pump which may be used by the pressure oxidation reactor of FIG. 2, and which is in accordance another aspect of the present invention.
Figure 4:
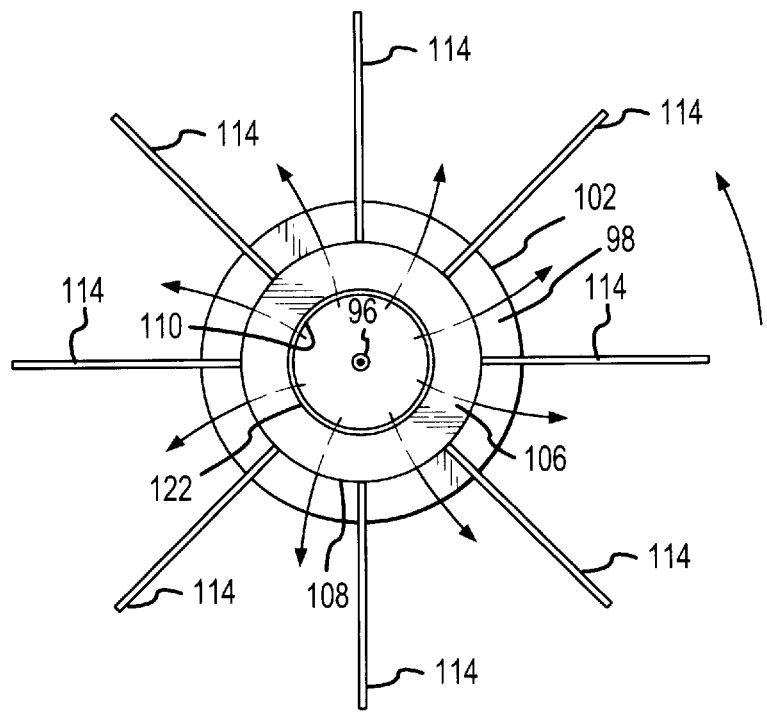
FIG. 4 is a bottom view of the agitator pump of FIG. 3.
Figure 5:
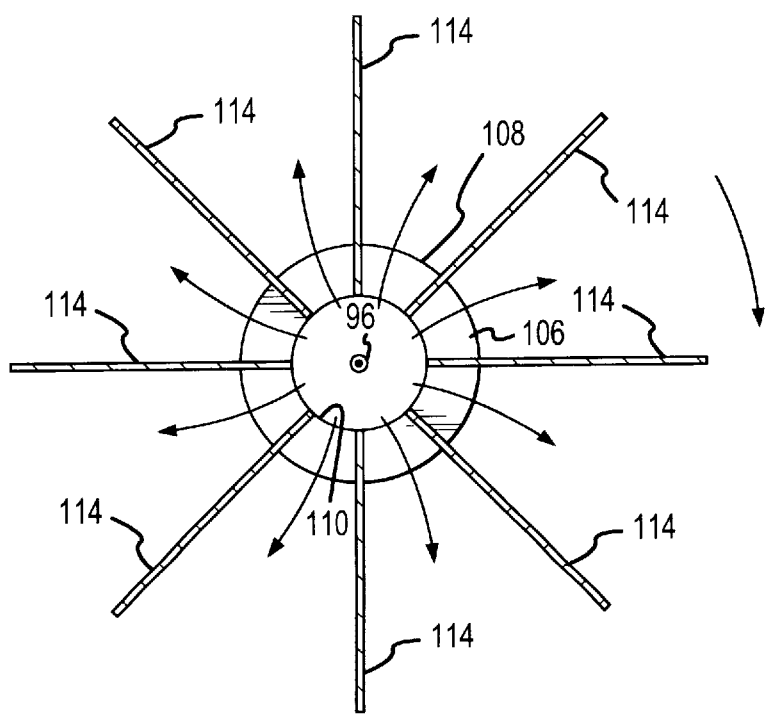
FIG. 5 is a cross-sectional view of the agitator pump of FIG. 3, taken along line 5—5.

In the reactor 26 shown in FIG. 2, one agitator 62 is disposed in each compartment 34 to agitate the contents of the reactor 26. More specifically, the agitator 62 shears oxygen gas bubbles to dispense the oxygen gas throughout the slurry in the reactor 26 to promote rapid dissolution of oxygen from the oxygen gas into the aqueous liquid phase of the slurry. It has been found with the present invention that increased oxygen utilization can often be realized by using an agitator 62 that cycles slurry within the reactor with a pumping action, to promote better gas dispersion within the reactor 26. An agitator operating with such a pumping action may be referred to as an agitator pump. Details regarding one embodiment of such an agitator is illustrated in FIGS. 3–5, which show one embodiment of an agitator pump 90 that could be used in place of one or more of the agitators 62 generally depicted in FIG. 2, and which will be described as if so installed in the reactor 26 in the place of one or more of the agitators 62.

With reference to FIGS. 2–5, the agitator pump 90 generally includes an upper partition 98 and a lower partition 106, which is disposed in vertically spaced relation to the upper partition 98. In the illustrated embodiment, the upper partition 98 and lower partition 106 are also disposed at least generally parallel to each other, which is the preferred configuration/orientation. Each of the upper partition 98 and lower partition 106 are in the form of a single-piece circular plate in the illustrated embodiment, with the upper partition 106 being of a larger diameter than the lower partition 106. Other configurations, assemblies and relative sizings may be utilized for one or both of the upper partition 98 and lower partition 106, so long as the upper partition and the lower partition form opposing barriers to define a pump cavity, as discussed below.

The space between the upper partition 98 and lower partition 106 defines a pump cavity 118. Access for drawing fluid into this pump cavity 118 is provided through a pump inlet aperture 110 which extends entirely through the lower partition 106. The pump inlet aperture 110 thereby projects at least generally toward the bottom 40 of the reactor 26. Preferably the center of the pump inlet aperture 110 is colinear with the rotational axis 96 of the agitator pump 90 as defined by its agitator pump drive shaft 94.

Generation of a pumping action by the agitator pump 90 is effected by rotating the pump drive shaft 94 to cause rotation of a plurality of radially-spaced vanes 114 through slurry contained within the reactor 26 during pressure oxidation. Preferably the vanes 114 are regularly spaced, and preferably there are at least about 2 of such vanes 114, and more preferably at least 4 (8 of the vanes 114 are shown in the illustrated embodiment). Typically the entirety of these vanes 114 will be totally submerged within slurry in the reactor 26 during pressure oxidation, and rotation of the agitator pump 90 about the rotational axis 96 causes the vanes 114 to propel slurry within the relevant compartment 34 radially outwardly relative to the rotational axis 96. The propulsion of slurry radially outwardly by the vanes 114 causes development of a lower pressure region, creating a fluid suction, within the pump cavity 118, which draws slurry and oxygen gas into the pump cavity 118 via the pump inlet aperture 110. Therefore, rotation of the vanes 114 about the rotational axis 96 effects a pumping action in which slurry is continually drawn into the pump cavity 118 through the pump inlet aperture 110 and expelled radially outward from the cavity, thereby agitating and mixing the contents of the reactor 26. One agitator structure, as shown in FIGS. 3–5, for effecting the pumping action is by fixedly attaching the drive shaft 94 to the upper partition 98, and further by fixedly attaching each of the plurality of vanes 114 to both the upper partition 98 and the lower partition 106. Other ways of assembling the agitator pump 90 could, however, be utilized instead as long as the pumping action is achieved.

Both the mineral material slurry and the oxygen gas enter the pump cavity 118 of the agitator pump 90 through the pump inlet aperture 110 formed through the lower partition 106. In the embodiment illustrated in FIGS. 3–5, the agitator pump includes a pump inlet conduit 122 interfacing with the lower partition 106 in alignment with the pump inlet aperture 110. This pump inlet conduit 122 is appropriately interconnected with the lower partition 106 and, when the agitator pump 90 is installed in the reactor 26, extends a least generally in a downward direction toward the bottom 40 of the pressure vessel 30. In the illustrated embodiment, the pump inlet conduit 122 is disposed in vertical relation and is colinear with the agitator pump drive shaft 94. Moreover, the pump inlet conduit 122 of each agitator pump 90 is preferably colinear with its corresponding oxygen supply line 58 (as shown in FIG. 2) within the reactor 26 (i.e., such that their centers are aligned). In the illustrated embodiment of the agitator pump 90, the open lower end 123 of the pump inlet conduit 122 serves as a fluid intake to the agitator pump 90, such that when in operation, slurry within the reactor 26 initially enters into the agitator pump 90 through the open lower end 123 of the pump inlet conduit 122 to be directed through the pump inlet aperture 110 into the pump cavity 118. The agitator pump 90 could be constructed and used without the pump inlet conduit 122. In that case, slurry would initially enter the agitator pump 90 directly through the pump inlet aperture 110 (rather than indirectly through the pump inlet conduit 122), and the pump inlet aperture 110 would serve as a fluid intake to the agitator pump 90. The design of the agitator pump 90 could obviously be modified to include a variety of configurations for a fluid intake. In a preferred design, however, the agitator used with the present invention to provide the pumping action has a fluid intake that opens toward the bottom 40 of the reactor 26.

Use of the pump inlet conduit 22, is, however, preferred. The pump inlet conduit 122 constrains the flow of slurry, focuses the flow to a generally central location of the pump cavity 118, and/or promotes capture of oxygen gas for effective delivery to the pump cavity 118. Moreover, the pump inlet conduit 122 distances the location of fluid intake into the agitator pump 90 from fluid expulsion from the agitator pump 90, and thereby tends to reduce the potential for premature cycling of slurry through the pump agitator 90.

In one embodiment, it is preferred to position the upper end of each compartment oxygen supply line 58 relatively close to the open lower end 123 of the pump inlet conduit 122. In one embodiment, there is about a 2 inch (5 cm) separation between the end of each compartment oxygen supply line 58 and its corresponding pump inlet conduit 122. Preferably, however, the spacing between a fluid intake of the agitator pump 90 and discharge end of a corresponding oxygen supply line 38 is no larger than about 12 inches (30 cm), and more preferably is no larger than about 6 inches (15 cm). Furthermore, it is preferred that the discharge end of the oxygen supply line 58 be located directly below the corresponding fluid intake, so that the flow of oxygen gas is directed substantially vertically upward toward the fluid intake.

Various orientations and/or configurations may be utilized for the vanes 114 of the agitator pump 90. FIGS. 3–5 illustrate an embodiment in which the vanes 114 have the following characteristics: 1) the vanes 114 extend in a radially outwardly direction in relation to the rotational axis 96 of the agitator pump 90; 2) the vanes 114 each initiate at the pump inlet aperture 110 and extend radially outwardly therefrom (i.e., the radially inward most portion of each of the vanes 114 terminates at the perimeter of the pump inlet aperture 110); 3) the vanes 114 each extend between the upper partition 98 and lower partition 106 from the upper partition 98 entirely down to the lower partition 106; 4) the vanes 114 each extend radially outwardly beyond a perimeter 102 of the upper partition 98, and also beyond a perimeter 108 of the lower partition 106; 5) the vanes 114 each extend vertically downward at the perimeter 108 of the lower partition 106 to a location vertically lower than the lower partition 106; 6) the vanes 114 each extend vertically upward at the perimeter 102 of the upper partition 98 to a location vertically about the upper partition 98; and 7) a portion of each of the vanes 114 are disposed on top of and interface with a surface of the upper 98 that is opposite the surface defining the upper extreme of the pump cavity 118 (e.g., an outer portion of the upper partition 98 is disposed within a notch formed in the vanes 114).

Figure 6:
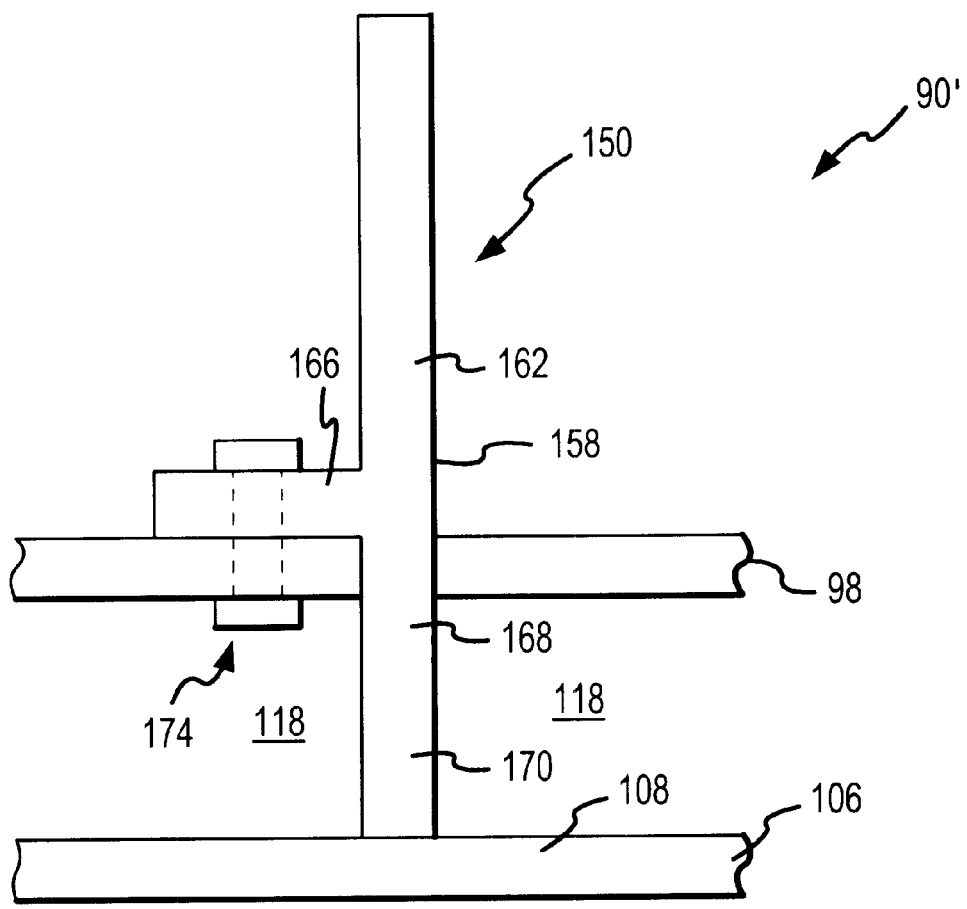
FIG. 6 is an end view, looking at least generally radially inwardly, of an alternative embodiment of a vane which may be utilized by the agitator pump of FIG. 3.
Figure 7:
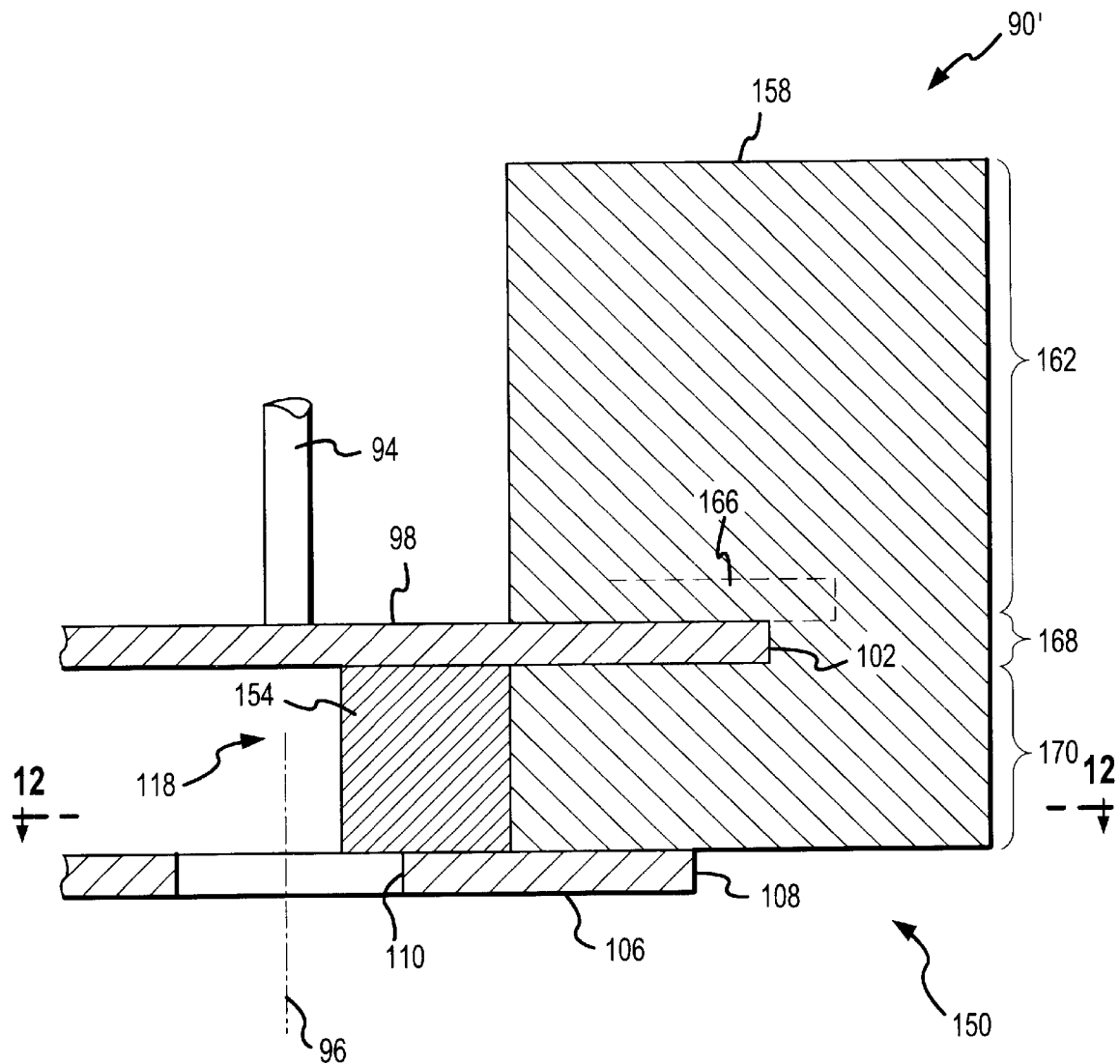
FIG. 7 is a cross-sectional view of the vane of FIG. 6.
Figure 12:
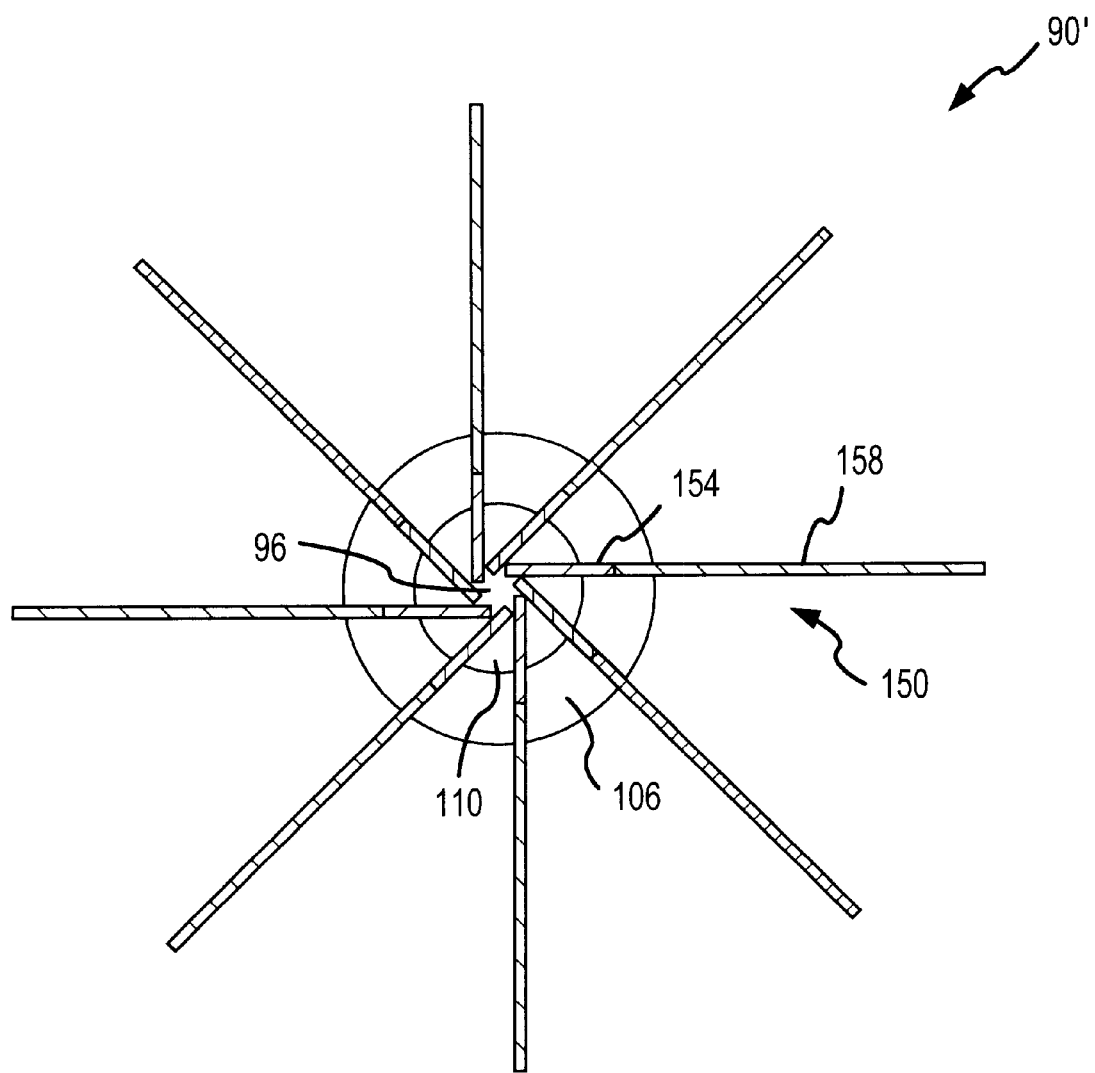
FIG. 12 is a cross-sectional view of the agitator pump of FIG. 7, taken along line 12—12.

A variation of the embodiment of the agitator pump shown in FIGS. 3–5 is presented in FIGS. 6–7 and 12. Components from the embodiment of FIGS. 3–5 which are utilized by the embodiment of FIGS. 6–7 are identified by the same reference numerals. A single prime designation is utilized to identify that there are, however, distinctions between the two embodiments. The primary distinction between the agitator pump 90' of FIGS. 6–7 and the agitator pump 90 of FIGS. 3–5 is in relation to the configuration/construction/orientation of the vanes 150 (FIGS. 6–7) compared to the vanes 114 (FIGS. 3–5). Initially, the vanes 150 utilize a two-part construction, whereas the vanes 114 are illustrated in the form of a unitary construction. In this regard, the vanes 150 of the agitator pump 90' include a fin 154 and a blade 158 disposed in abutting relation to the fin 154 and extending radially outwardly from the fin 154. A portion of each fin 154 extends over a portion of the pump inlet aperture 110, as illustrated in FIG. 7. That is, a radially inwardmost portion of the fin 154 is disposed inwardly from a perimeter of the pump inlet aperture 110. In the case of the agitator pump 90', the vanes 150 do not extend radially outwardly from the rotational axis 96, but instead are slightly offset therefrom. This is shown in FIG. 12, where it is seen that the vanes 150 do not converge at the rotational axis 96, but are slightly offset from the rotational axis 96. Moreover, in the embodiment of the agitator pump 90' shown in FIG. 12, the fins 154 of the vanes 150 are offset from the rotational axis 96 in a manner to form a geometric pattern about the rotational axis 96 overlying the inlet aperture 110. The agitator pump 90', as shown in FIG. 12, would ordinarily be rotated in a clockwise direction during operation.

The vanes 150 of FIGS. 6–7 also utilize a different configuration than that of the vanes 114 from FIGS. 3–5. FIGS. 6–7 illustrate that the vanes 150 have the following characteristics: 1) both the fins 154 and the blades 158 (portion 170) extend from the upper partition 98 entirely down to the lower partition 106; 2) the fins 154 do not extend beyond the perimeter 102 of the upper partition 98 or beyond the perimeter 108 of the lower partition 106; 3) the blades 158 extend beyond the perimeter 102 of the upper partition 98 and also beyond the perimeter 108 of the lower partition 106; 4) the blades 158 extend vertically downward at the perimeter 108 of the lower partition 106 (i.e., the lower extreme of portion 170 is disposed at the same elevation as that surface of the lower partition 106 which defines the lower extreme of the pump cavity 118); 5) a portion 168 of the blades 158 extends radially outwardly from the perimeter 102 of the upper partition 98; 6) a portion 162 of the blades 158 is disposed at a higher elevation than the upper partition 98; and 7) the blades 158 are disposed on top of and interface with a surface of the upper partition 98 opposite that which defines the pump cavity 118, including a portion 166 which is used to interconnect the blade 158 with the upper partition 98.

One way of constructing the agitator pump 90' is as follows: 1) the agitator pump drive shaft 94 is bolted onto the upper partition 98 with an appropriate flange (not shown); 2) the plurality of fins 154 are welded to the upper partition 98 in the desired position (i.e. the upper partition 98 and the fins 154 are metal in one embodiment); 3) the lower partition 106 is disposed in the desired position and each of the fins 154 are welded to the lower partition 106 (i.e., the lower partition 106 is metal in one embodiment); and 4) the blades 158 are disposed in proper alignment and are detachably interconnected with the upper partition 98 by one or more mechanical fasteners 174. In one embodiment the blades 158 are of a unitary or integral construction (i.e., such that there is no mechanical joint of any kind), and are formed from materials such as ceramic or titanium. As such, the blades 158 can be replaced as needed.

Although the description in reference to FIGS. 1–7 and 12 provided above has been primarily in reference to a specific type of reactor used for pressure oxidation operations, the features described are applicable also to other chemical processing situations. For example, the disclosed agitator embodiments can be incorporated into any reactor having an interior reactor volume that is susceptible to agitation or mixing of the type provided by the agitator of the present invention. Also, the discussion above in relation to the manner of introducing oxygen gas and mineral material feed into the reactor for pressure oxidation operations applies also to the introduction of any components into other reactor systems in combination with the agitation of the present invention. For example, one or more flows of feed containing components to be mixed could be fed in any chemical processing operation into the relevant reactor in an upwardly directed flow toward the fluid intake of the agitator. The locational relationships between the introduction of feeds and the agitator are easily translatable between different chemical processing operations. This is so even though any particular chemical processing operation may have more or fewer than the two feed streams as discussed with respect to FIG. 2. For example, during pressure leaching operations, it would be preferred to direct the feed of mineral material in an upward flow toward the fluid intake of the agitator, even though there is no flow of oxygen gas being introduced into the reactor. Likewise, other chemical processing operations may have three or more feed streams that could be directed at the fluid intake of the agitator, if desired, to promote efficient mixing of the feed components through the agitator according to the present invention. Furthermore, when using a multi-stage reactor, splitting of feed streams between compartments, in a manner as discussed above for pressure oxidation, can be advantageously applied to other reactor systems when using a multi-stage reactor, such as for example when the situation involves an exothermic process or some other attribute conducive to splitting feed between compartments.

In a general sense, the aspects of the present invention involving agitation, and also refinements thereto concerning introduction of feed streams in relation to the agitation, are applicable to any chemical processing situation when it is desirable to mix two or more components in a contained volume of a flowable medium. As used herein, a flowable medium refers to a medium that has properties of flowability sufficient to be cycled through the agitator pump useful with the present invention. Such flowability is typically provided by the presence of a liquid in the medium at least to the extent that the medium exhibits fluid properties of flow, such as is the case with the slurries containing particulate mineral materials that may be processed during pressure oxidation and pressure leaching operations. Therefore, for example, the flowable medium will typically include at least one liquid phase, but may include two or more liquid phases, which could be in the form of an emulsion or otherwise. Moreover, the flowable medium may include one or more gaseous phases, such as is the case with the oxygen gas during pressure oxidation operations. Also, as noted, the flowable medium can include one or more particulate solid phases, such as in the slurries processed during pressure oxidation and pressure leaching.

One mixing situation for application of the present invention involves maintaining a multi-component, and typically multi-phase, flowable medium in a well mixed state, which may be referred to as homogenization. In this situation, the agitation is used simply to prevent phase separation, such as preventing settling of solid particulates in a slurry medium. One aspect of the agitation of the invention as used in pressure oxidation and pressure leaching operations is that the agitation maintains a homogenized mixture of the solids and liquid in the reactor during processing.

Another mixing situation for application of the present invention involves dispersing material from a feed stream introduced into a volume of flowable medium throughout the volume. In this situation, the agitation is preferably combined with introduction of the feed material in a flow directed at a fluid intake of an agitator pump. One aspect of the agitation of the invention as used in pressure oxidation and pressure leaching is that fresh mineral material feed introduced into the reactor is dispersed throughout the reactor by the agitation. In the case of pressure oxidation, the agitation also effects dispersion of the oxygen gas in the flowable medium. It should be noted that the material to be dispersed may or may not be a reactant in the system. In the case of pressure oxidation, for example, the oxygen gas is a reactant. Such may not be the case for other systems. For example, in wastewater processing operations, the agitation of the present invention could be used to aerate water, even though the aeration gas does not contain a reactant.

Yet another mixing situation for application of the present invention involves mixing two or more different feed streams with each other and also with a contained volume of flowable medium. For example, in the case of pressure oxidation, flows of both the mineral material feed and the oxygen gas feed may be directed toward the fluid intake to an agitator pump, effecting both intimate mixing of the oxygen gas with the mineral material feed and dispersion of both the oxygen gas and the mineral material feed throughout the reactor volume.

The agitation of the present invention operates most effectively when processing flowable mediums of a high viscosity, so long as the viscosity of the medium is at least low enough that the medium is in fact practically flowable through the agitator. Slurries, such as those encountered during pressure oxidation and pressure leaching operations, typically exhibit high viscosities. It has traditionally been particularly difficult to obtain good mixing of such high viscosity mediums. In that regard, it was found during pressure oxidation of certain refractory sulfide gold ores that as the viscosity of the slurry became higher, it became more difficult to achieve good sulfide oxidation, limiting the density of slurries that could be effectively processed to those of around 35–40 weight percent solids or lower. With the present invention, however, slurry densities as high as 55 weight percent, and possibly higher, may be effectively pressure oxidized. In general, the agitation of the present invention is well suited for mixing/agitating a flowable medium having a viscosity greater than about 10 centipoise, preferably greater than about 100 centipoise and more preferably greater than about 1000 centipoise.

As discussed above, one specific example of a chemical processing operation for application of one or more aspects of the present invention is pressure oxidation. The pressure oxidation may involve processing any metal-containing sulfide mineral material feed. Non-limiting examples of sulfide minerals that may be processed are those including one or more of copper, nickel, zinc, lead, cobalt, vanadium, tungsten, molybdenum, silver and iron. When pressure oxidizing iron sulfides, the object is often to recover gold or some other precious metal contained within the iron sulfide mineral. In the case of most of these metals, such as for example copper, nickel, zinc and lead, the metal of interest will ordinarily dissolve into the liquid phase during the pressure oxidation operation. As noted previously, gold will typically remain with solid residue from the pressure oxidation operation.

Another specific example of a chemical processing operation for application of one or more aspects of the present invention is pressure leaching. Pressure leaching can be performed on any mineral material containing a metal that is directly leachable from the mineral material. Mineral materials processed by pressure leaching are most often oxidized ores or concentrates made from flotation of such ores. Non-limiting examples of metals that may be processed by pressure leaching include copper, nickel, zinc, lead, cobalt, gold, silver, platinum, palladium, vanadium, uranium, tungsten, molybdenum, manganese, and aluminum, to the extent those metals are contained within mineral materials that are directly leachable, such as in many oxide ores or concentrates thereof.

With respect to pressure oxidation and pressure leaching, processing of mineral material feed is primarily contemplated, as discussed above. The scope of the invention is not, however, so limited. Pressure oxidation could be performed on any metal sulfide material in a form that can be slurried for processing, and pressure leaching could be performed on any leachable metal containing material in a form that can be slurried for processing. As one example, copper, gold, silver, platinum, palladium and/or other conductive metals could be pressure leached from ground circuit boards or other electrical components containing the metal(s).

Yet another specific example of a chemical processing application for one or more aspects of the present invention is water treatment, and specifically for aeration of water, or aeration of sludge produced during wastewater treatment operations.

Still another specific example of a chemical processing application for one or more aspects of the present invention is paper industry for mixing whiteners, such as peroxides, into paper pulp slurries.

A number of examples are provided to further illustrate one or more aspects of the present invention and/or advantages associated with one or more such aspects.

Data from the examples is presented tabularly in the Tables 1–4, as referenced in the examples. Because the same format is used in each of these Tables, a brief discussion of that format is provided at this point. In Tables 1–3, Column 1 lists different ranges of sulfide sulfur content in mineral material feed for different processing runs, and is expressed as weight percent sulfide sulfur in the mineral material feed. The "+" sign for the highest range of sulfide sulfur content means that the sulfide sulfur content was equal to or greater than the noted amount, whereas the "−" sign for the lowest range means that the sulfide sulfur content was equal to or smaller than the noted amount. Column 2 shows the average flow rate of mineral material feed in tons of mineral material per 12-hour operating shift fed into the reactor for various processing runs. Column 3 shows the average weight percent of sulfide sulfur in the mineral material for various processing runs. Column 4 shows the average quantity in tons per 12-hour operating shift of sulfide sulfur processed for various processing runs. Column 5 shows the average weight percent of sulfide sulfur in solid residue discharged from the reactor for various processing runs. Column 6 shows the average quantity of oxygen gas in thousands of pounds per 12-hour operating shift fed to the reactor for various processing runs. Column 7 shows the average concentration of free acid in liquid discharged from the reactor, in grams of acid per liter of liquid, for various processing runs. Column 8 shows the average gold recovery by cyanide leaching of the reactor discharge as a percentage of gold originally in the mineral material feed for various processing runs. Column 9 shows the average extent of sulfide sulfur oxidation occurring in the reactor, expressed as a percentage of sulfide sulfur originally in the mineral material feed, for various processing runs. Column 10 shows the average ratio of the pounds of oxygen gas fed to the reactor per pounds of sulfide sulfur oxidized in the reactor for various processing runs. Column 11 shows the average oxygen utilization efficiency expressed as a percentage of the oxygen gas fed to the reactor that is consumed to oxidize sulfide sulfur in the reactor for various processing runs, calculated based on stoichiometric oxygen requirements to oxidize that quantity of sulfide sulfur actually oxidized. In table 4, Columns 1–10 provide a consolidated summary of the same data provided in Columns, 2–11 of Tables 1–3.

EXAMPLE 1

Figure 8:
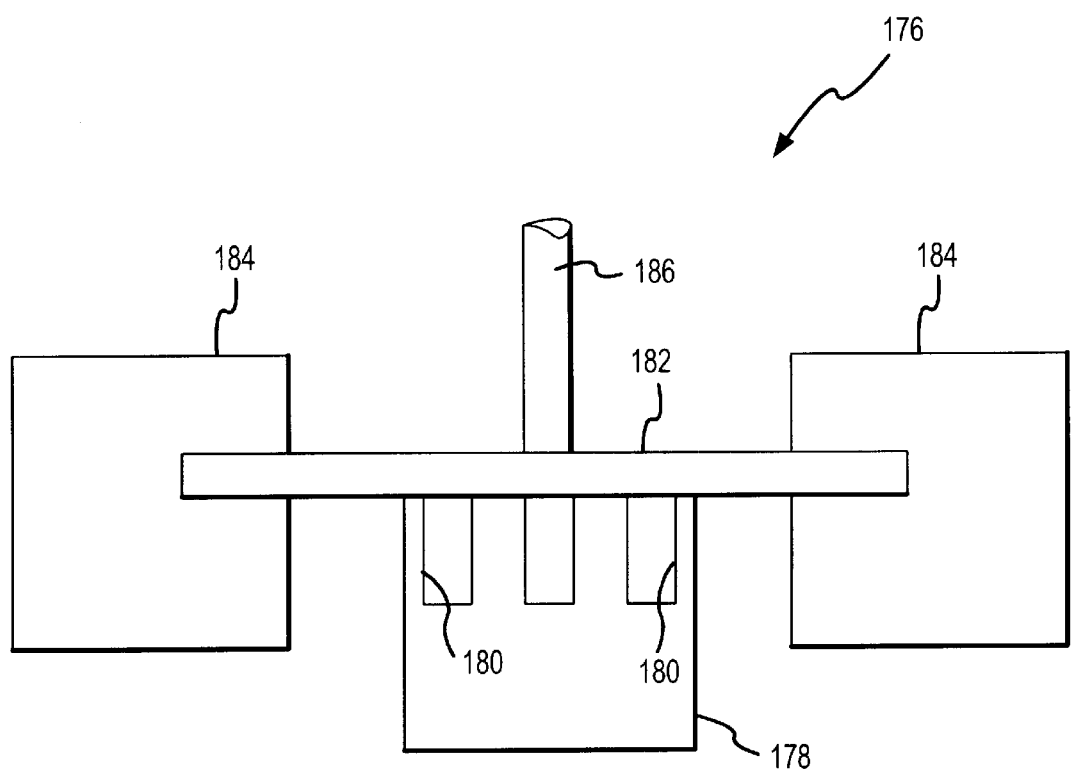
FIG. 8 is a side view of an agitator used to generate data for Example 1.
Figure 9:
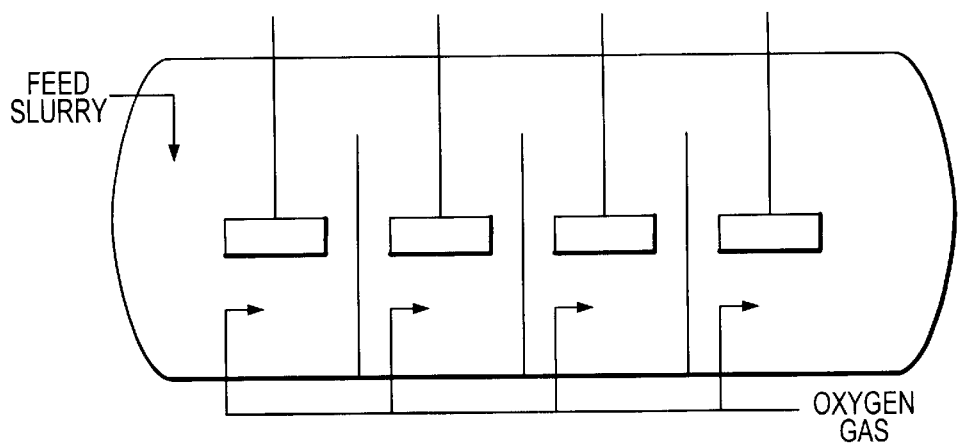
FIG. 9 is a schematic of a reactor showing the configuration for introducing oxygen gas and mineral material feed for Example 1.

A slurry of refractory sulfide gold ore and/or concentrate from the Lone Tree Mine, of Newmont Mining Corporation, in Nevada, U.S.A. is introduced in a vertically downward direction into the lower portion of the first compartment of a four-stage autoclave, while oxygen gas is introduced horizontally into the lower portion of each compartment, as shown schematically in FIG. 9. The sulfide gold ore/concentrate is in particulate form having a P80 size of about 200 mesh. An agitator is disposed in each stage of the autoclave. Each of the agitators in the first two compartments has a design as shown in FIG. 8. FIG. 8 shows an agitator 176 including a plate 182 and eight vanes 184 detachably mounted to the plate 182. Also mounted on the plate 182 is a castled pipe 178 having a plurality of slots 180 formed therein on the end of the pipe 178 that interfaces with the plate 182. The slots 180 extend through the wall of the pipe 178 and are disposed in at least substantially equally radially spaced relation about the center axis of the castled pipe 178. The castled pipe 178 has a diameter and length of 20 inches (51 cm), and includes 8 of the slots 180 which each are 8 inches (20 cm) wide and 7 inches (18 cm) long. Each of the agitators in the third and fourth compartments has the design as shown in FIG. 8, except without the castled pipe 178. None of these agitators provides the pumping action desired with the present invention. Oxygen gas is fed 60% to the first compartment, 25% to the second compartment, 10% to the third compartment and 5% to the fourth compartment of the autoclave. Pressure oxidation is conducted at a temperature of from about 190° C. to about 200° C. and a total pressure of about 273 psig (1882 kPa), including an oxygen gas overpressure of about 55 psi (379 kPa). The feed slurry to the autoclave is generally maintained at a slurry density in a range of from about 35% to about 40% solids.

Table 1 presents data from several pressure oxidation processing runs using mineral material feeds having a variety of sulfide sulfur contents. As expected, oxygen utilization efficiency tends to drop when processing mineral material feeds having lower sulfide sulfur contents.

TABLE 1

| COL 1 SULFIDE SULFUR RANGE (%) | COL 2 INLET FEED (TPS) | COL 3 AVG S = % | COL 4 S = (TPS) | COL 5 S = (%) ACD | COL 6 KLBS OXYGEN | COL 7 FREE ACID | COL 8 GOLD RECOVERY | COL 9 SULFUR OXIDATION | COL 10 LBS O2/ LBS S = OXI. | COL 11 OXYGEN UTILIZATION |
|---|---|---|---|---|---|---|---|---|---|---|
| +7.0 | 674 | 7.225 | 48.7 | 0.978 | 202.5 | 10.7 | 94.95% | 86.47% | 2.31 | 82.78% |
| 6.75–6.99 | 616 | 6.824 | 42.0 | 0.761 | 193.0 | 9.2 | 93.11% | 88.81% | 2.49 | 76.55% |
| 6.50–6.74 | 691 | 6.619 | 45.8 | 0.913 | 203.3 | 7.7 | 91.37% | 86.20% | 2.46 | 77.21% |
| 6.25–6.49 | 666 | 6.351 | 42.3 | 0.819 | 203.0 | 9.4 | 92.37% | 87.08% | 2.65 | 71.81% |
| 6.0–6.24 | 702 | 6.118 | 43.0 | 0.778 | 200.7 | 7.6 | 91.20% | 87.26% | 2.58 | 74.12% |
| 5.75–5.99 | 727 | 5.888 | 42.8 | 0.912 | 203.0 | 6.6 | 90.98% | 84.50% | 2.70 | 70.42% |
| 5.5–5.74 | 740 | 5.604 | 41.4 | 1.070 | 205.0 | 5.9 | 90.65% | 80.86% | 2.96 | 64.87% |
| 5.25–6.49 | 751 | 5.372 | 40.4 | 1.016 | 203.7 | 7.0 | 91.18% | 81.10% | 3.01 | 63.66% |
| 5.0–5.24 | 761 | 5.124 | 39.0 | 0.996 | 204.8 | 6.5 | 90.57% | 80.59% | 3.16 | 60.68% |
| 4.75–4.99 | 745 | 4.877 | 36.3 | 0.904 | 205.5 | 7.9 | 91.03% | 81.48% | 3.39 | 57.00% |
| 4.5–4.74 | 790 | 4.624 | 36.5 | 0.516 | 209.3 | 7.4 | 91.81% | 88.87% | 3.13 | 61.50% |
| 4.25–4.49 | 809 | 4.459 | 36.1 | 0.633 | 208.8 | 7.4 | 91.58% | 85.82% | 3.31 | 58.80% |
| 4.0–4.24 | 839 | 4.222 | 35.4 | 0.542 | 211.1 | 8.1 | 90.13% | 87.34% | 3.35 | 57.58% |
| 3.75–3.99 | 799 | 3.881 | 31.0 | 0.356 | 204.5 | 14.3 | 90.84% | 90.76% | 3.62 | 54.79% |

TABLE 1-continued

| COL 1 SULFIDE SULFUR RANGE (%) | COL 2 INLET FEED (TPS) | COL 3 AVG S = % | COL 4 S = (TPS) | COL 5 S = (%) ACD | COL 6 KLBS OXY-GEN | COL 7 FREE ACID | COL 8 GOLD RE-COVERY | COL 9 SULFUR OXIDA-TION | COL 10 LBS O2/ LBS S = OXI. | COL 11 OXY-GEN UTILI-ZATION |
|---|---|---|---|---|---|---|---|---|---|---|
| 3.5–3.74 | 788 | 3.588 | 28.3 | 0.186 | 183.0 | 20.1 | 96.36% | 94.76% | 3.25 | 58.55% |
| 3.25–3.49 | 867 | 3.364 | 29.2 | 0.712 | 198.3 | 16.1 | 91.27% | 78.87% | 4.93 | 47.99% |
| 3.0–3.24 | 804 | 3.171 | 25.5 | 0.329 | 196.1 | 21.1 | 90.46% | 90.15% | 4.47 | 46.98% |
| 2.75–2.99 | 840 | 2.764 | 23.2 | 0.040 | 188.0 | 22.0 | 93.38% | 98.55% | 3.90 | 48.76% |
| 2.5–2.74 | 788 | 2.734 | 21.5 | 0.037 | 198.0 | 15.3 | 88.27% | 98.65% | 4.43 | 43.00% |
| 2.25–2.49 | 816 | 2.390 | 19.5 | 0.081 | 179.2 | 15.8 | 82.66% | 96.62% | 4.68 | 41.22% |
| –2.24 | 1,004 | 1,960 | 19.7 | 0.073 | 196.6 | 13.8 | 72.47% | 96.09% | 5.11 | 37.60% |

EXAMPLE 2

Figure 10:
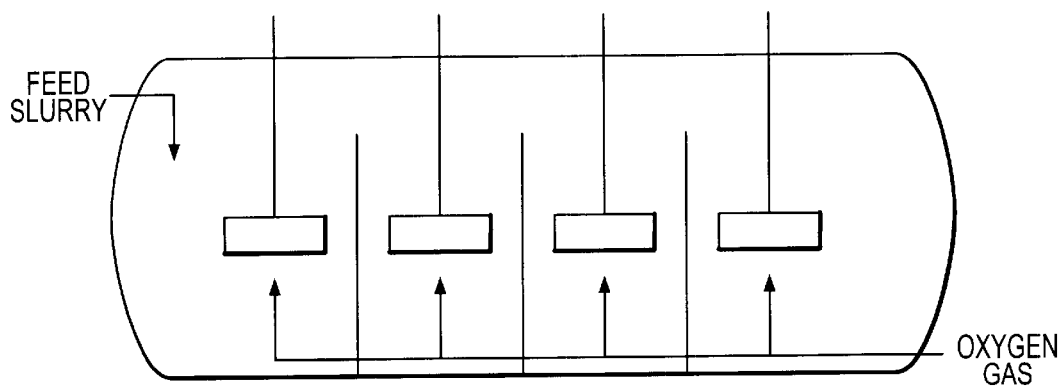
FIG. 10 is a schematic of a reactor showing the configuration for introducing oxygen gas and mineral material feed for Example 2.

Pressure oxidation is conducted as described in Example 1, except that the autoclave is configured so that oxygen gas is introduced into each of the first and second compartments in the lower portion of each stage in a vertically upward direction from directly below the fluid intake of the corresponding agitator, as shown schematically in FIG. 10. Also, an agitator pump of a design a shown in FIGS. 6–7 is used in each of the first and second compartments of the autoclave, instead of agitators having the design shown in FIG. 8 as used in Example 1. The agitator pump in each of the first and second compartments is disposed in vertical relation and in axial alignment with the corresponding oxygen discharge line. The feed slurry to the autoclave is generally maintained at a slurry density of from about 40% to about 45% solids.

Table 2 presents data from several pressure oxidation processing runs using mineral material feeds having a variety of sulfide sulfur contents. Compared to Example 1, the use of the agitator pump in the first two compartments has significantly increased oxygen utilization efficiency. Furthermore, a significantly higher average flow of mineral material feed is processed per shift. Particularly, remarkable however, is that the higher throughput is achieved generally without detrimentally impacting pressure oxidation performance, as demonstrated by high sulfide sulfur oxidation levels and high gold recoveries shown in Table 2.

TABLE 2

| COL 1 SULFIDE SULFUR RANGE (%) | COL 2 INLET FEED (TPS) | COL 3 AVG S = % | COL 4 S = (TPS) | COL 5 S = (%) ACD | COL 6 KLBS OXY-GEN | COL 7 FREE ACID | COL 8 GOLD RE-COVERY | COL 9 SULFUR OXIDA-TION | COL 10 LBS O2/ LBS S = OXI. | COL 11 OXY-GEN UTILI-ZATION |
|---|---|---|---|---|---|---|---|---|---|---|
| +7.0 | | | | | | | | | | |
| 6.75–6.99 | | | | | | | | | | |
| 6.50–6.74 | | | | | | | | | | |
| 6.25–6.49 | | | | | | | | | | |
| 6.0–6.24 | | | | | | | | | | |
| 5.75–5.99 | 984 | 5.958 | 58.6 | 1.240 | 206.0 | 15.5 | 94.06% | 79.19% | 2.11 | 90.24% |
| 5.5–5.74 | | | | | | | | | | |
| 5.25–5.49 | 1,005 | 5.351 | 53.8 | 1.577 | 206.8 | 9.1 | 89.89% | 70.49% | 2.62 | 73.29% |
| 5.0–5.24 | 986 | 5.062 | 49.9 | 0.969 | 209.3 | 5.7 | 89.30% | 80.89% | 2.47 | 77.41% |
| 4.75–4.99 | 897 | 4.831 | 43.3 | 0.684 | 202.0 | 9.6 | 89.39% | 85.87% | 2.63 | 73.89% |
| 4.5–4.74 | 1,006 | 4.671 | 47.0 | 0.958 | 207.0 | 7.2 | 88.59% | 79.44% | 2.66 | 72.50% |
| 4.25–4.49 | 1,007 | 4.381 | 44.1 | 0.783 | 209.7 | 5.3 | 88.89% | 82.11% | 2.80 | 68.80% |
| 4.0–4.24 | 1,016 | 4.124 | 41.9 | 0.679 | 210.5 | 5.2 | 92.21% | 83.51% | 2.90 | 66.45% |
| 3.75–3.99 | 1,022 | 3.896 | 39.8 | 0.512 | 209.1 | 5.8 | 92.00% | 86.88% | 2.92 | 66.32% |
| 3.5–3.74 | 980 | 3.613 | 35.4 | 0.285 | 210.8 | 8.2 | 94.07% | 92.14% | 3.11 | 62.23% |
| 3.25–3.49 | 1,008 | 3.370 | 34.0 | 0.335 | 211.5 | 7.0 | 93.64% | 90.04% | 3.31 | 57.96% |
| 3.0–3.24 | 934 | 3.115 | 29.1 | 0.255 | 200.4 | 7.6 | 89.57% | 91.99% | 3.64 | 52.95% |
| 2.75–2.99 | 1,026 | 2.916 | 29.9 | 0.181 | 203.0 | 5.8 | 92.43% | 93.82% | 3.45 | 55.58% |
| 2.5–2.74 | 1,040 | 2.520 | 26.2 | 0.104 | 210.0 | 5.0 | 93.61% | 95.87% | 3.97 | 47.91% |
| 2.25–2.49 | | | | | | | | | | |
| –2.24 | 984 | 2.223 | 21.9 | 0.112 | 213.3 | 4.7 | 91.67% | 94.75% | 5.00 | 39.16% |

EXAMPLE 3

Figure 11:
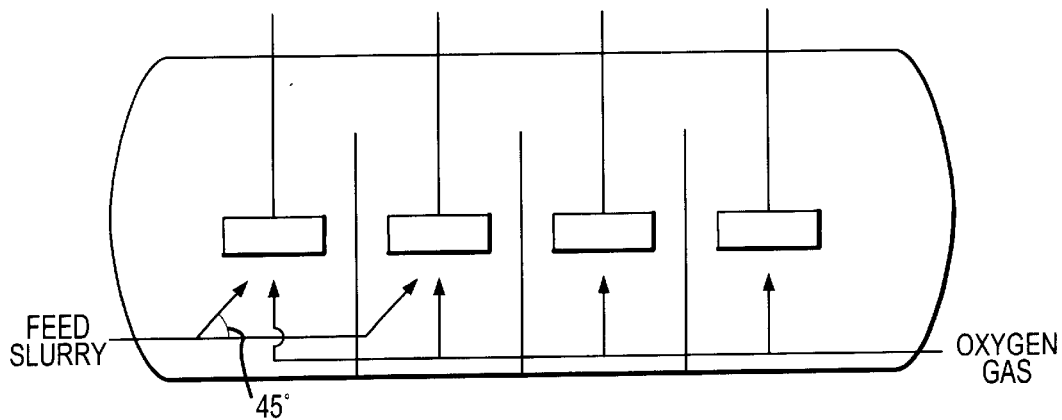
FIG. 11 is a schematic of a reactor showing the configuration for introducing oxygen gas and mineral material feed for Example 3.

Pressure oxidation is conducted as described in Example 2, except that the total mineral material feed is evenly split between the first compartment and the second compartment of the autoclave, and oxygen gas is split 46% to the first compartment, 46% to the second compartment, 5% to the third compartment and 3% to the fourth compartment. Also, the flow of mineral material feed is introduced into the first and second compartments in an upward direction directed at the corresponding agitator pump, as shown schematically in FIG. 11. Also, an agitator pump of the design as shown in FIGS. 6–7 is used in each of the four compartments. The feed slurry to the autoclave is generally maintained at a slurry density of around 46% to 47% solids.

Table 3 presents data from several pressure oxidation runs using mineral material feeds having a variety of sulfide sulfur contents.

TABLE 3

| COL 1 SULFIDE SULFUR RANGE (%) | COL 2 INLET FEED (TPS) | COL 3 AVG S = % | COL 4 S = (TPS) | COL 5 S = (%) ACD | COL 6 KLBS OXY-GEN | COL 7 FREE ACID | COL 8 GOLD RE-COVERY | COL 9 SULFUR OXIDA-TION | COL 10 LBS 02/ LBS S = OXI. | COL 11 OXY-GEN UTILI-ZATION |
|---|---|---|---|---|---|---|---|---|---|---|
| +7.0 | | | | | | | | | | |
| 6.75–6.99 | | | | | | | | | | |
| 6.50–6.74 | | | | | | | | | | |
| 6.25–6.49 | | | | | | | | | | |
| 6.0–6.24 | | | | | | | | | | |
| 5.75–5.99 | | | | | | | | | | |
| 5.5–5.74 | | | | | | | | | | |
| 5.25–5.49 | | | | | | | | | | |
| 5.0–5.24 | 939 | 5.123 | 48.09 | 0.347 | 203 | 17.1 | 93.99% | 93.22% | 2.16 | 88.59% |
| 4.75–4.99 | 1,026 | 4.868 | 49.92 | 0.662 | 208 | 13.2 | 95.46% | 86.44% | 2.33 | 82.62% |
| 4.5–4.74 | 1,000 | 4.672 | 46.72 | 0.497 | 212 | 14.2 | 95.20% | 89.43% | 2.47 | 77.85% |
| 4.25–4.49 | 881 | 4.384 | 38.64 | 0.268 | 207 | 14.6 | 95.20% | 93.89% | 2.78 | 70.20% |
| 4.0–4.24 | 956 | 4.126 | 39.44 | 0.348 | 213 | 13.2 | 92.05% | 91.50% | 2.87 | 67.30% |
| 3.75–3.99 | 1,111 | 3.896 | 43.28 | 0.422 | 208 | 6.8 | 94.58% | 89.18% | 2.59 | 75.29% |
| 3.5–3.74 | 1,078 | 3.635 | 39.20 | 0.340 | 205 | 6.7 | 94.10% | 90.63% | 2.75 | 70.13% |
| 3.25–3.49 | 1.126 | 3.368 | 37.94 | 0.289 | 208 | 5.2 | 93.97% | 91.41% | 2.86 | 67.79% |
| 3.0–3.24 | 1,030 | 3.147 | 32.41 | 0.333 | 202 | 5.4 | 93.61% | 89.41% | 3.34 | 57.79% |
| 2.75–2.99 | 1,063 | 2.830 | 30.07 | 0.284 | 198 | 5.7 | 95.20% | 89.97% | 3.51 | 55.13% |
| 2.5–2.74 | | | | | | | | | | |
| 2.25–2.49 | | | | | | | | | | |
| −2.24 | | | | | | | | | | |

As seen in FIG. 3, oxygen utilization efficiency is generally improved in relation to the data of Example 2, and sulfide sulfur oxidation and gold recoveries remain high.

A combined summary of data from Examples 1–3 is presented in Table 4.

TABLE 4

| | COL 1 INLET FEED (TPS) | COL 2 AVG S = % | COL 3 S = (TPS) | COL 4 S = (%) ACD | COL 5 KLBS OXY-GEN | COL 6 FREE ACID | COL 7 GOLD RE-COVERY | COL 8 SULFUR OXIDA-TION | COL 9 LBS 02/ LBS S = OXI. | COL 10 OXY-GEN UTILI-ZATION |
|---|---|---|---|---|---|---|---|---|---|---|
| Example 1 | 757 | 5.157 | 39.049 | 0.835 | 204 | 11.4 | 90.54% | 84.23% | 3.12 | 62.79% |
| Example 2 | 1001 | 3.980 | 39.846 | 0.584 | 209 | 7.3 | 91.59% | 86.05% | 3.01 | 65.00% |
| Example 3 | 1021 | 4.005 | 40.573 | 0.379 | 206 | 10.2 | 94.24% | 90.51% | 2.76 | 71.27% |

There are a number of notable observations regarding the data presented in Table 4. One is that the average free acid content in the autoclave discharge and sulfur oxidation occurring during pressure oxidation are within acceptable ranges for all of the Examples. Another is that the ratio of the quantity of oxygen gas feed to the autoclave per pound of sulfide sulfur oxidized is smaller for Example 2 vs. Example 1 and is smaller for Example 3 vs. either Example 1 or Example 2. Correspondingly, the average oxygen gas utilization efficiency is higher for Example 2 vs. Example 1 and is higher for Example 3 vs. either Examples 1 or 2.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The terms "comprise", "include", "have" and "contain", and variations of those terms, as may be used to describe features that make up one or more aspect of the invention and as may be recited in the claims, are intended to indicate only that a particular feature is present to a specified extent, and are not intended to limit the presence of other features or the presence of a particular feature beyond the specified extent, unless such a limitation is otherwise expressly stated.

What is claimed is:

1. A method for pressure oxidation of a mineral material comprising at east one sulfide mineral to free at least one metal value from the sulfide mineral to facilitate recovery of the metal value, the method comprising:

introducing a feed of the mineral material in particulate form into a reactor, so that, in the reactor, the mineral material is in a slurry with a liquid;

introducing oxygen gas into the reactor to contact the slurry and oxidize at least a portion of the sulfide mineral to thereby free at least a portion of the metal value from the sulfide; and agitating the slurry within the reactor, the agitating comprising drawing into and expelling from a cavity of a rotating agitator at least portions of the slurry and the oxygen gas to cycle the portions of the slurry and the oxygen gas through the cavity with a pumping action, wherein the agitator comprises a vane and at least a portion of the vane extends outside of the cavity so that during the rotating the vane contacts the slurry outside of the cavity.

2. The method of claim 1, wherein:

the introducing oxygen gas into the reactor comprises directing a flow of oxygen gas toward a fluid intake through which the portions of the slurry and the oxygen gas enter the agitator for direction to the cavity.

3. The method of claim 2, wherein:

the introducing the feed of the mineral material into the reactor comprises directing a flow of a feed slurry including the mineral material toward the fluid intake.

4. The method of claim 2, wherein:

the flow of oxygen gas is introduced into the reactor at a location vertically lower than the fluid intake.

5. The method of claim 4, wherein:

the flow of oxygen gas is introduced into the reactor at a location directly below the fluid intake, and the flow of oxygen gas is directed at the fluid intake in a substantially vertically upward direction.

6. The method of claim 1, wherein:

the cavity is defined between first and second spaced partitions of the agitator.

7. The method of claim 6, wherein:

the drawing comprises introducing the portions of the slurry and the oxygen gas through at least one aperture formed in the first partition.

8. The method of claim 7, wherein:

the first and second partitions are vertically spaced, with the second partition at a vertically higher elevation than the first partition; and the introducing oxygen gas into the reactor comprises directing a flow of oxygen gas into the slurry at a location vertically lower than the first partition, the flow of oxygen gas being directed at an upward angle relative to horizontal in a direction toward a fluid intake of the agitator that is in fluid communication with the cavity.

9. The method of claim 8, wherein:

the flow of oxygen gas is introduced into the slurry at a location that is no farther than about 12 inches (30 cm) from the fluid intake.

10. The method of claim 9, wherein:

the aperture is the fluid intake.

11. The method of claim 8, wherein:

the agitator comprises an inlet conduit fluidly interconnected with the aperture and an open end of the inlet conduit is the fluid intake.

12. The method of claim 11, wherein:

the flow of oxygen gas is directed at least generally toward a center of the fluid intake along a path that is at least substantially axially aligned with the inlet conduit.

13. The method of claim 7, wherein:

the agitator comprises a plurality of said vane; and the drawing and expelling comprise rotating the plurality of vanes about an axis of rotation to create a fluid suction within the cavity.

14. The method of claim 13, wherein:

the axis of rotation extends through the aperture.

15. The method of claim 14:

wherein at least a portion of each of the vanes extends in a vertical direction between the first and second partitions from at least the first partition to at least the second partition.

16. The method of claim 15, wherein:

the portion of each of the vanes that extends in a vertical direction between the first and second partitions extends generally in a direction from the perimeters of the first and second partitions inward toward the aperture.

17. The method of claim 15, wherein:

at least a portion of each of the vanes extends in a direction away from the aperture to a location radially beyond a perimeter of each of the first and second partitions.

18. The method of claim 1, wherein:

the drawing and expelling comprises rotating at least a portion of the agitator to create a fluid suction within the cavity.

19. The method of claim 1, wherein the introducing the feed of mineral material comprises:

introducing at least a first flow of the feed of mineral material into the reactor at a first location; and introducing at least a second flow of the feed of mineral material into the reactor at a second location spaced from the first location.

20. The method of claim 19, wherein:

the reactor is a multi-stage reactor having a plurality of compartments arranged in series with adjacent of the compartments in series being at least partially separated by a divider; and the introducing at least a first flow comprises introducing the first flow of the feed of mineral material into a first compartment in series of the compartments, and the introducing at least a second flow comprises introducing the second flow of feed into a second compartment in series of the compartments.

21. The method of claim 20, wherein:

each of the first and second compartments has at least one the agitator disposed therein, and the agitating is executed independently within each of the first and second compartments.

22. The method of claim 21, wherein:
the introducing oxygen gas into the reactor comprises directing a first flow of oxygen gas into the first compartment and directing a second flow of oxygen gas into the second compartment.

23. The method of claim 22, wherein:
the first flow of oxygen gas is directed at a first said agitator agitating in the first compartment and the second flow of oxygen gas is directed at a second said agitator agitating in the second compartment.

24. The method of claim 23, wherein:
the first flow of feed is directed toward the first agitator and the second flow of feed is directed toward the second agitator.

25. The method of claim 20, wherein:
the reactor comprises at least a third compartment in series of the compartments, wherein all of the mineral material entering the third compartment flows from the second compartment.

26. The method of claim 20, wherein:
the first flow of feed is at a first flow rate and the second flow of feed is at a second flow rate, the first and second flow rates being substantially the same.

27. The method of claim 20, wherein:
at least a portion of the mineral material in the feed is a whole ore.

28. The method of claim 20, wherein:
at least a portion of the mineral material in the feed is a sulfide concentrate produced in a flotation operation.

29. The method of claim 1, wherein:
the metal value comprises at least one metal component selected from the group consisting of copper, nickel, zinc, lead, cobalt, vanadium, tungsten, molybdenum and combinations thereof.

30. The method of claim 29, comprising:
in the reactor, dissolving at least a portion of the metal component into the liquid; and
discharging the liquid from the reactor and thereafter recovering at least a portion of the metal component from the liquid.

31. The method of claim 30, wherein:
the recovering comprises at least one of selective precipitation, ion exchange, solvent extraction and electrowinning of at least a portion of the metal component.

32. The method of claim 1, wherein the metal comprises gold in association with the sulfide mineral.

33. The method of claim 32, comprising:
maintaining the slurry within the reactor at a temperature of at least 160° C.

34. The method of claim 32, wherein:
the introducing oxygen gas into the reactor comprises introducing the oxygen gas into the reactor at an oxygen gas overpressure of at least about 10 psi (69 kPa).

35. The method of claim 32, comprising discharging from the reactor an oxidized slurry and thereafter leaching at least a portion of the gold from solid residue of the oxidized slurry with a leaching solution including a lixiviant for gold.

36. The method of claim 35, wherein the mineral material comprises at least one metal component selected from the group consisting of copper, nickel, zinc, lead, cobalt, vanadium, tungsten and combinations thereof, the method comprising:
in the reactor, dissolving at least a portion of the metal component into the liquid; and
recovering at least a portion of the metal component from liquid of the oxidized slurry.

37. The method of claim 36, wherein the recovering the metal component comprises at least one of selective precipitation, ion exchange, solvent extraction and electrowinning of at least a portion of the metal component.

38. The method of claim 37, wherein the metal component comprises copper.

39. The method of claim 38, wherein the recovering comprises solvent extraction of at least a portion of the copper.

40. The method of claim 1, wherein:
during the introducing a feed, at least a first flow of the feed is introduced into the reactor at a first location and at least a second flow of the feed is introduced into the reactor at a second location.

41. The method of claim 40, wherein:
the reactor comprises a plurality of compartments arranged in series, with adjacent of the compartments in series being at least partially separated by a divider; and
the first flow is introduced into a first compartment in series of the compartments, and the second flow is introduced into a second compartment in series of the compartments.

42. The method of claim 41, wherein:
the agitating is executed independently within each of the first and second compartments.

43. The method of claim 42, wherein:
the introducing oxygen gas comprises directing a first flow of oxygen gas into the first compartment and directing a separate second flow of oxygen gas into the second compartment.

44. The method of claim 43, wherein:
the first flow of oxygen gas is directed toward a fluid intake of a first said agitator disposed in the first compartment and the second flow of oxygen gas is directed toward a fluid intake of a second said agitator disposed in the second compartment.

45. The method of claim 41, wherein:
the reactor comprises at least a third compartment in series of the compartments, wherein all of the mineral material within the third compartment flows from the second compartment.

46. The method of claim 40, wherein:
the first flow of the feed and the second flow of the feed each comprise at least about 25 weight percent of the feed.

47. The method of claim 46, wherein:
the first flow of the feed comprises at least about 50 weight percent of the feed.

48. The method of claim 40, wherein the metal value comprises gold.

49. The method of claim 48, comprising discharging from the reactor an oxidized slurry and thereafter leaching at least a portion of the gold from solid residue of the oxidized slurry with a leach solution including a lixiviant for gold.

50. A pressure oxidation system, comprising:
a feed system;
a reactor comprising:
(i) a pressure vessel comprising at least a first inlet, a second inlet and a first outlet, wherein the feed system is fluidly interconnected with the first inlet so that a feed slurry is introducible into the pressure vessel through the first inlet; and (ii) at least one rotatable agitator pump disposed inside of the pressure vessel, wherein the at least one agitator pump comprises a drive shaft, a cavity and a pair of vertically spaced partitions, wherein a first said partition comprises a first inlet aperture and a second said partition is fixedly interconnected with the drive shaft, and wherein the agitator pump further comprises a plurality of vanes extending at least between the first and second partitions, wherein at least a portion of one or more of the vanes extends outside of the cavity; and an oxygen supply system fluidly interconnected with the second inlet of the pressure vessel.

51. The system of claim 50, wherein:

the first and second partitions are disposed in at least substantially parallel and horizontal relation; and the portion of the one or more of the vanes extends beyond a perimeter of at least one of the first and second partitions in a direction at least generally away from the first inlet aperture.

52. The system of claim 51, wherein:

each of the one or more of the vanes has a height greater than a spacing between the first and second partitions, wherein at least a portion of each of the one or more of the vanes extends vertically above at least the second partition.

53. A pressure oxidation system, comprising:

a feed system;

a reactor comprising:

(i) a pressure vessel comprising at least first and second compartments, a first inlet to the first compartment, a second inlet to the second compartment, a third inlet, and a first outlet, wherein a first divider at least partially isolates the first compartment from the second compartment, and wherein the feed system is fluidly interconnected with each of the first and second inlets whereby a feed slurry is simultaneously introducible directly into each of the first and second compartments from the feed system; and (ii) at least one agitator pump disposed in each of the first and second compartments, wherein the agitator pump comprises a cavity and a plurality of vanes, wherein at least a portion of one or more of the vanes extends outside of the cavity; and an oxygen supply system fluidly interconnected with at least the third inlet to the pressure vessel whereby oxygen is introducible into the pressure vessel from the oxygen supply system.

54. A chemical reactor, comprising:

a vessel having an interior reactor volume to contain a fluid; and at least one rotatable agitator disposed within the interior reactor volume, the agitator comprising a cavity and a plurality of vanes, wherein at least a portion of one or more of the plurality of vanes extends outside of the cavity;

wherein, when the agitator is submerged in a fluid contained within the reactor volume and rotated, a fluid suction is created within the cavity and at least portions of the fluid are cycled through the cavity to agitate the fluid.

55. The chemical reactor of claim 54, wherein:

the agitator comprises a first partition and a second partition in spaced relation to the first partition; and the cavity is located between the first partition and the second partition.

56. The chemical reactor of claim 55, wherein:

at least a portion of each of the vanes is disposed between the first and second partitions.

57. The chemical reactor of claim 56, wherein:

the agitator is rotatable about an axis of rotation that extends through the cavity; and the portion of each of the vanes disposed between the first and second partitions extends generally in a radially inwardly direction in relation to the axis of rotation.

58. The chemical reactor of claim 57, wherein:

the first partition includes at least one aperture through which fluid is introduced into the cavity during operation of the agitator.

59. The chemical reactor of claim 58, wherein:

the second partition is connected with a shaft that is rotatable to rotate the agitator.

60. The chemical reactor of claim 56, wherein:

the portion of each of the vanes disposed between the first and second partitions extends at least from the first partition to the second partition.

61. The chemical reactor of claim 56, wherein:

the second partition is vertically elevated in relation to the first partition.

62. The chemical reactor of claim 54, comprising:

at least one first fluid inlet through which a first fluid is introducible into the reactor volume;

the first fluid inlet being configured so that when the first fluid is introduced into the reactor volume from the first fluid inlet, flow of the first fluid exiting the first fluid inlet is directed at a fluid intake of the agitator.

63. The chemical reactor of claim 62, comprising:

at least one second fluid inlet through which a second fluid is introducible into the reactor volume;

the second fluid inlet being configured so that when the second fluid is introduced into the reactor volume from the second fluid inlet, flow of the second fluid exiting the second fluid inlet is directed at the fluid intake.

64. The chemical reactor of claim 63, wherein:

flow of the first fluid and flow of the second fluid intersect in the vicinity of the fluid intake.

65. The chemical reactor of claim 63, wherein:

the reactor volume is divided into a plurality of compartments arranged in series;

at least one of the agitator is disposed in each of at least two of the compartments; and each of the two compartments has at least one of the first fluid inlet.

66. The chemical reactor of claim 63, wherein:

each of the two compartments has at least one of the first fluid inlet and at least one of the second fluid inlet.

67. A method for pressure leaching at least one metal value from a metal-containing mineral material, the method comprising:

introducing a feed of the mineral material in particulate form and a leach liquid into a reactor, so that in the reactor the mineral material is in a slurry with the leach liquid;

in the reactor, dissolving at least a portion of the metal value from the mineral material into the leach liquid; and agitating the slurry within the reactor, the agitating comprising drawing into and expelling from a cavity of a rotating agitator at least portions of the slurry to cycle the portions of the slurry through the cavity with a pumping action, wherein the agitator comprises a plurality of vanes with at least a portion of one or more of the vanes extending outside of the cavity, so that during the rotating the one or more of the vanes contacts the slurry outside of the cavity.

68. The method of claim 67, wherein:

the metal value is selected from the group consisting of copper, nickel, cobalt, platinum, palladium, gold, uranium, vanadium, tungsten, molybdenum, zinc, manganese and aluminum.

69. A method for dispersing a material in a flowable medium, the method comprising:

introducing a material into a contained volume of a flowable medium;

dispersing the material in the flowable medium, the dispersing comprising drawing into and expelling from a cavity of a rotating agitator, disposed within the contained volume of the flowable medium, at least portions of the flowable medium and the material to cycle the portions through the cavity with a pumping action, wherein the agitator comprises a plurality of vanes and at least a portion of one or more of the vanes extends outside of the cavity, so that during the rotating the one or more of the vanes contacts a portion of the flowable medium located outside of the cavity.

70. The method of claim 69, wherein the material comprises a first reactant and the flowable medium comprises a second reactant, the method comprising:

reacting, in the reactor, at least the first reactant and the second reactant to form at least one reaction product.

71. A method for mixing multiple components of a flowable medium comprising the components, the method comprising:

circulating at least portions of the flowable medium through an agitator pump at least partially submerged in a contained volume of the flowable medium;

the circulating comprising rotating the agitator pump to create a fluid suction in a cavity of the agitator pump, thereby causing at least portions of the flowable medium to be drawn into the cavity and expelled from the cavity with a pumping action, wherein the agitator pump comprises a plurality of vanes and at least a portion of the one or more of the vanes extends outside of the cavity, so that during the rotating the one or more of the vanes contacts the flowable medium outside of the cavity.

72. The method of claim 15, wherein:

at least a portion of each of the vanes extends in a direction away from the aperture to a location radially beyond a perimeter of at least one of the first and second partitions.

73. The method of claim 15, wherein:

the first and second partitions are vertically spaced, with the second partition at a vertically higher elevation than the first partition; and the portion of each of the vanes that extends outside of the cavity extends to a location vertically above the second partition.

74. The method of claim 15, wherein:

the first and second partitions are vertically spaced, with the second partition at a vertically higher elevation than the first partition; and the portion of each of the vanes that extends outside of the cavity extends to a location vertically below the first partition.

75. The method of claim 1, wherein:

the rotating agitator comprises a rotatable drive shaft that extends longitudinally in a vertical direction.

76. The method of claim 75, wherein:

the cavity is located adjacent a vertically lower longitudinal end of the drive shaft.

77. The system of claim 52, wherein:

each of the one or more of the vanes has a height greater than a spacing between the first and second partitions, wherein at least a portion of each of the one or more of the vanes extends vertically below at least the first partition.

78. The system of claim 50, wherein the drive shaft extends longitudinally in a vertical direction.

79. The system of claim 78, wherein the cavity is located adjacent a vertically lower longitudinal end of the drive shaft.

80. The system of claim 50, wherein a portion of each of the one or more of the vanes extends beyond a perimeter of each of the first and second partitions.

81. The system of claim 50, wherein the feed system comprises the feed slurry, the feed slurry including at least an aqueous liquid and a sulfide mineral material in particulate form.

82. The system of claim 53, wherein the feed system comprises the feed slurry, the feed slurry including at least an aqueous liquid and a sulfide mineral material in particulate form.

* * * * *

UNITED STATES PATENT AND TRADEMARK OFFICE
CERTIFICATE OF CORRECTION

PATENT NO.    : 6,576,041 B2
DATED         : June 10, 2003
INVENTOR(S)   : Cole

It is certified that error appears in the above-identified patent and that said Letters Patent is hereby corrected as shown below:

<u>Column 31,</u>
Line 11, delete the word "east", and insert therefor -- least --.

Signed and Sealed this

Twenty-second Day of July, 2003

JAMES E. ROGAN
*Director of the United States Patent and Trademark Office*